(12) United States Patent
Sanders

(10) Patent No.: US 9,434,491 B2
(45) Date of Patent: *Sep. 6, 2016

(54) OVENABLE CORRUGATED PAPER CONTAINER

(71) Applicant: The Ovenable Paper Pan Company, LLC, Glenwillow, OH (US)

(72) Inventor: Scott Sanders, Moreland Hills, OH (US)

(73) Assignee: The Ovenable Paper Pan Company, LLC, Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/502,100

(22) Filed: Sep. 30, 2014

(65) Prior Publication Data

US 2015/0014328 A1    Jan. 15, 2015

Related U.S. Application Data

(63) Continuation of application No. 13/628,158, filed on Sep. 27, 2012, now Pat. No. 8,883,237, which is a continuation of application No. 12/696,398, filed on Jan. 29, 2010, now Pat. No. 8,304,004, which is a continuation-in-part of application No. 11/215,421, filed on Aug. 30, 2005, now abandoned, which is a continuation-in-part of application No. 10/120,996, filed on Apr. 11, 2002, now abandoned.

(51) Int. Cl.
*B65D 3/22*    (2006.01)
*B65B 29/08*   (2006.01)
(Continued)

(52) U.S. Cl.
CPC .............. *B65B 29/08* (2013.01); *A47J 36/022* (2013.01); *A47J 36/025* (2013.01); *A47J 36/04* (2013.01); *A47J 37/01* (2013.01); *B31B 1/74* (2013.01); *B31B 1/88* (2013.01); *B32B 9/06* (2013.01); *B32B 27/10* (2013.01); *B32B 29/08* (2013.01); *B65D 1/34* (2013.01); *B65D 3/22* (2013.01); *B65D 5/56* (2013.01); *B65D 81/264* (2013.01);
(Continued)

(58) Field of Classification Search
CPC ............ B65D 3/22; B65D 1/34; B65D 1/28; B65D 81/264; B65D 81/34; B65D 81/343; B65D 81/386; B65D 2581/3046; B65D 5/56; B32B 9/06; B32B 27/10; B32B 29/002; B32B 2/08; B65B 29/08; B31B 1/74; B31B 1/88; B31B 43/00; B31B 45/00; A47J 36/04; A47J 36/022; A47J 36/025; A47J 37/01
USPC ................. 426/113, 127; 229/5.84, 406, 903
See application file for complete search history.

(56) References Cited

U.S. PATENT DOCUMENTS

| 1,811,566 A | 6/1931 | Scott |
| 2,170,040 A | 8/1939 | Stuart |

(Continued)

FOREIGN PATENT DOCUMENTS

AU    199333903    9/1993

OTHER PUBLICATIONS

Gisslen, Wayne, "Professional Baking" 2nd Edition, John Wiley and Sons, Inc., p. 36 (1994(.

(Continued)

*Primary Examiner* — Drew Becker
(74) *Attorney, Agent, or Firm* — Fay Sharpe LLP

(57) ABSTRACT

An ovenable paper container containing an inner liner, an outer liner, and an intermediate or corrugated paper layer positioned between the inner liner and the outer liner. The ovenable paper container can be used to heat and/or cook food and then be used as a serving container without the danger of causing burns.

22 Claims, 6 Drawing Sheets

(51) Int. Cl.

| | | |
|---|---|---|
| *B65D 81/38* | (2006.01) | |
| *B65D 81/26* | (2006.01) | |
| *B65D 5/56* | (2006.01) | |
| *B65D 1/34* | (2006.01) | |
| *B32B 27/10* | (2006.01) | |
| *B32B 9/06* | (2006.01) | |
| *B32B 29/08* | (2006.01) | |
| *A47J 37/01* | (2006.01) | |
| *B65D 81/34* | (2006.01) | |
| *A47J 36/02* | (2006.01) | |
| *A47J 36/04* | (2006.01) | |
| *B31B 1/74* | (2006.01) | |
| *B31B 1/88* | (2006.01) | |

(52) U.S. Cl.
CPC ........... *B65D 81/343* (2013.01); *B65D 81/386* (2013.01); *B65D 2581/3406* (2013.01)

(56) References Cited

U.S. PATENT DOCUMENTS

| | | | |
|---|---|---|---|
| 3,308,006 A | | 3/1967 | Kresse |
| 3,861,576 A | | 1/1975 | Tolaas et al. |
| 3,924,013 A | | 12/1975 | Kane |
| 4,026,458 A | | 5/1977 | Morris et al. |
| 4,147,836 A | | 4/1979 | Middleton et al. |
| 4,373,636 A | | 2/1983 | Hoffman |
| 4,595,611 A | | 6/1986 | Quick et al. |
| 4,757,940 A | | 7/1988 | Quick et al. |
| 4,950,524 A | * | 8/1990 | Hacker .................... B32B 3/28 219/732 |
| 5,002,833 A | | 3/1991 | Kinsey, Jr. et al. |
| 5,075,360 A | | 12/1991 | Fitt et al. |
| 5,205,473 A | | 4/1993 | Coffin, Sr. |
| 5,231,268 A | | 7/1993 | Hall et al. |
| 5,352,465 A | | 10/1994 | Gondek et al. |
| 5,494,716 A | | 2/1996 | Seung et al. |
| 5,500,191 A | | 3/1996 | Dematte |
| 5,543,606 A | | 8/1996 | Gics |
| 5,575,418 A | | 11/1996 | Wu et al. |
| 5,603,996 A | | 2/1997 | Overcash et al. |
| 5,665,295 A | | 9/1997 | Takamoto et al. |
| 5,697,550 A | | 12/1997 | Varano et al. |
| 5,698,295 A | | 12/1997 | Benner et al. |
| 5,839,653 A | | 11/1998 | Zadravetz |
| 5,855,973 A | | 1/1999 | Calvert et al. |
| 6,068,897 A | | 5/2000 | Adur et al. |
| 6,103,802 A | | 8/2000 | Zhang et al. |
| 6,184,510 B1 | | 2/2001 | Zucker |
| 6,193,831 B1 | | 2/2001 | Overcash et al. |
| 6,200,644 B1 | | 3/2001 | Ulfstedt et al. |
| 6,253,995 B1 | | 7/2001 | Blok |
| 6,291,075 B1 | | 9/2001 | Zhang et al. |
| 6,422,456 B1 | | 7/2002 | Sadlier |
| 6,450,398 B1 | | 9/2002 | Muise et al. |
| 6,491,214 B2 | | 12/2002 | Plummer |
| 6,639,199 B1 | | 10/2003 | Ross |
| 6,926,197 B2 | | 8/2005 | Hed et al. |
| 7,000,825 B2 | | 2/2006 | Alexander et al. |
| 8,304,003 B1 | * | 11/2012 | Sanders .................... A21B 3/00 229/406 |
| 8,304,004 B2 | * | 11/2012 | Sanders .................... B31B 7/00 229/406 |
| 8,883,237 B2 | * | 11/2014 | Sanders .................... A47J 37/01 229/406 |
| 2002/0036229 A1 | | 3/2002 | Muise et al. |
| 2002/0179697 A1 | | 12/2002 | Pope |
| 2003/0010817 A1 | | 1/2003 | Lingle |
| 2003/0129332 A1 | | 7/2003 | O'Neill et al. |
| 2003/0226882 A1 | | 12/2003 | Porchia et al. |
| 2003/0229180 A1 | | 12/2003 | Trent et al. |
| 2005/0031834 A1 | | 2/2005 | Mason et al. |
| 2005/0048300 A1 | | 3/2005 | Mason |
| 2006/0029771 A1 | * | 2/2006 | O'Neill .................... B32B 3/266 428/137 |
| 2007/0131667 A1 | | 6/2007 | Amato |
| 2008/0193687 A1 | * | 8/2008 | Asayama ................ B65D 1/34 428/34.2 |
| 2010/0018410 A1 | | 1/2010 | Covelli |
| 2010/0193579 A1 | | 8/2010 | Becker |
| 2011/0192890 A1 | | 8/2011 | Chebli |
| 2015/0059287 A1 | | 3/2015 | Sanders |

OTHER PUBLICATIONS

Gralex, Inc., Advertisement for corragated thermoformers (no date).
Gralex, Inc., Advertisement for hydraulic thermoformers (no date).
Gralex, Inc., Brochure (2002).
Gralex, Inc., Brochure for hydraulic forming presses (no date).
Meadwestvaco, Ovenable liner specification sheet (2002).
Gralex, Inc., Brochure for hydraulic thermoforming presses (2002).

* cited by examiner

OVENABLE CORRUGATED PAPER CONTAINER

This application is a continuation of U.S. patent application Ser. No. 13/628,158 filed Sep. 27, 2012, which in turn is a continuation of U.S. patent application Ser. No. 12/696,398 filed Jan. 29, 2010 (now U.S. Pat. No. 8,304,004; granted Nov. 6, 2012), which is in turn a continuation-in-part of U.S. patent application Ser. No. 11/215,421 filed Aug. 30, 2005, now abandoned, which in turn is a continuation-in-part of U.S. patent application Ser. No. 10/120,996 filed Apr. 11, 2002, now abandoned, which is incorporated herein by reference.

TECHNICAL FIELD

The subject invention generally relates to a paper container suitable for use in an oven, more particularly to a paper container that includes one or more layers of corrugated paper that is suitable for use in an oven, and even more particularly to a paper container that includes one or more layers of corrugated paper that is thermoformed with one or more other types of paper material so that the thermoformed container can be used in an oven. In particular, the subject invention relates to a cooking and serving paper container and methods of making and using the paper container, which paper container includes one or more layers of thermoformed corrugated paper.

BACKGROUND OF THE INVENTION

Many foods are prepared in an oven. Most often, such foods are placed on/in a metal baking container or a glass-baking container. Since metal and glass baking containers become extremely hot during the baking process, it is dangerous to use the metal or glass-baking container as a serving container immediately after removal from an oven. This is due to the threat of a burn injury if flesh comes in contact with the extremely hot metal or glass-baking container. Transferring food from a hot baking container to a temperate serving container can be cumbersome, particularly in a restaurant environment where food preparation and handling activities are mitigated to maximize delivery volume. In addition, when food has to be transferred from one container to another container, damage to the food product can occur which can result in wasted food. Furthermore, the temperature of the food can be adversely affected when transferred to a hot container to a much cooler container. Also, metal and glass containers are relatively heavy and expensive, burdensome to store, and costly to keep clean. Another difficulty with metal containers and some types of glass containers is that they cannot be used in microwave oven cooking.

There is a growing market demand for disposable paperboard containers for use in baking applications with food products. However, many foods are difficult to successfully package because they have a tendency to stick to the paperboard when baked. This is especially true for food products containing higher levels of sugar. As sugar caramelizes upon heating, adherence to paperboard is particularly problematic. In addition, paper containers can be susceptible to igniting when cooking, thus damaging the container, potentially damaging the food in the container, and also potentially damaging the oven wherein the food is being cooked. In view of the current problems with ovenable paper containers, there is a need for a paper container that can be used to cook food in an oven that inhibits or prevents the food from sticking to the surface of the paper container during and after the cooking process, and which can be handled by a consumer shortly after being removed form an oven without concern of causing burns to the consumer when handling the paper container.

SUMMARY OF THE INVENTION

The subject invention provides an ovenable paper container that includes one or more layers of corrugated paper and which paper container is suitable for baking food products and for immediately serving the food product without transferring the food product to a serving plate. Due to insulation properties of the paper container, the ovenable paper container that has been used to cook food may be immediately used as a serving container for the cooked food without the danger of causing burns to those who handle the paper container.

One non-limiting aspect of the invention relates to an ovenable paper container that includes an inner liner, an outer liner and an intermediate or corrugated paper layer positioned between the inner and outer liner. The inner liner includes an upper and lower surface. The inner liner typically is fully or partially formed of a paper substrate. The paper substrate used in the inner liner is generally not a corrugated paper material; however, the inner liner can include corrugated paper. The inner liner generally includes a single layer of a paper substrate; however, the inner liner can include more than one layer of paper substrate. When two or more layers of paper substrate are used to form the inner liner, the layers of paper substrate may be formed of the same or different material and may or may not be corrugated paper layers. When the inner liner is formed of a single layer of paper substrate, the upper surface of the single layer of paper is generally formed of a single piece of material so that the upper surface is a seamless surface; however, this is not required. When the inner layer is formed of two or more layers of paper substrate, the top layer of the paper substrate has an upper surface that is generally formed of a single piece of material so that the upper surface is a seamless surface; however, this is not required. The seamless upper surface, when formed, forms a more uniform surface that is believed to result in more uniform cooking of foods that are placed in the paper container. The outer liner includes an upper and lower surface. The outer liner typically is partially or fully formed of a paper substrate. The paper substrate used in the outer liner is generally not a corrugated paper material; however, the outer liner can include corrugated paper. The outer liner generally includes a single layer of a paper substrate; however, the outer liner can include more than one layer of paper substrate. When two of more layers of paper substrate are used to form the outer liner, the layers of paper substrate may be formed of the same or different material and may or may not be corrugated paper layers. When the outer liner is formed of a single layer of paper substrate, the bottom surface of the single layer of paper is generally formed of a single piece of material so that the bottom surface is a seamless surface; however, this is not required. When the outer layer is formed of two or more layers of paper substrate, the bottom layer of paper substrate has a bottom surface that is generally formed of a single piece of material so that the bottom surface is a seamless surface; however, this is not required. The seamless bottom surface, when formed, forms a more uniform surface that is believed to result in better uniform cooking of foods that are placed in the paper container. In addition, the seamless bottom surface, when formed, is believed to better inhibit or prevent liquids in or from the food from leaking through the outer layer of the container 1) during the heating or cooking of food in the container, 2) prior to the heating or cooking of the food in the container, and/or 3) after the heating or cooking of the food in the container. The paper substrate composition of the inner and outer liners can the same or different. The thicknesses of the inner and outer liners can also be the same or different. The one or more layers of corrugated paper are positioned between the upper surface of the outer liner and the lower surface of the inner liner. When two or more layers of corrugated paper are used, one or more layers of non-corrugated paper can be positioned between two layers of corrugated paper; however, this is not required. Generally, an upper surface of a layer of corrugated paper is connected to the lower surface of the inner liner. Generally, the connection is formed by an adhesive; however, other or additional connection arrangements can be used (e.g., crimping, melted seam, compression bonding, melted polymeric coating, etc.). Also a lower surface of a layer of corrugated paper is connected to the upper surface of the outer liner. Generally, the connection is formed by an adhesive; however, other or additional connection arrangements can be used (e.g., crimping, melted seam, compression bonding, melted polymeric coating, etc.). When the paper container includes only a single layer of corrugated paper, the upper surface of the single layer of corrugated paper is generally connected to the lower surface of the inner liner and the lower surface of the single layer of corrugated paper is generally connected to the upper surface of the outer liner.

In another and/or alternative non-limiting aspect of the invention, the ovenable paper container can include a polymeric coating on one or more surfaces of the inner liner. Generally the polymeric coating is located of the upper surface of the inner liner or on a food product side of the inner liner. A polymeric coating can also be applied to the lower surface of the outer liner. When a polymeric coating is present on the upper surface of the inner liner, the polymeric coating can be used to inhibit or prevent food from sticking to the inner liner when the food is heated on the inner liner; however, this is not required. The polymeric coating, when present in the upper surface of the inner liner, can also or alternatively be used to inhibit or prevent liquids on or from the food in the container to be absorbed by the paper substrate of the inner liner prior to, during and/or after the heating or cooking of food in the container; however, this is not required. The polymeric coating, when present in the upper surface of the inner liner, can also or alternatively be used to increase the strength and integrity of the inner liner and/or inhibit or prevent the deformation of the inner liner prior to, during and/or after the heating or cooking of food in the container; however, this is not required. The polymeric coating, when present in the upper surface of the inner liner, can also or alternatively be used to inhibit or prevent burn and/or other types of heat damage to the inner liner during the heating and/or cooking of foods in the paper container.

In still another and/or alternative non-limiting aspect of the invention, the paper container is designed to heat or cook foods in oven temperatures that reach temperatures as high as at least about 200° F. and to resist burning, charring and/or delamination of one or more of the layers of the paper container during the heating or cooking of the food in the container. In one non-limiting embodiment of the invention, the paper container is designed to heat or cook foods in temperatures of about 200° F.-600° F. and to resist burning, charring and/or delaminating one or more layers of the paper container during the heating or cooking of the food in the container. In another non-limiting embodiment of the invention, the paper container is designed to heat or cook foods in temperatures of about 250° F.-550° F. and to resist burning, charring and/or delamination of one or more layers of the paper container during the heating or cooking of the food in the container. In still another non-limiting embodiment of the invention, the paper container is designed to heat or cook foods in temperatures of about 275° F.-500° F. and to resist burning, charring and/or delamination of one or more layers of the paper container during the heating or cooking of the food in the container. In still another non-limiting embodiment of the invention, the paper container is designed to heat or cook foods in temperatures of about 300° F.-500° F. and to resist burning, charring and/or delamination of one or more layers of the paper container during the heating or cooking of the food in the container.

In yet another and/or alternative non-limiting aspect of the invention, the weight of the inner liner, outer linter and corrugated paper layer are selected to ensure the integrity of the paper container prior to, during and after the heating and cooking of food in the paper container. In one non-limiting embodiment of the invention, the weight of the inner liner is generally at least about 10 pounds per thousand square feet. In one non-limiting aspect of this embodiment, the weight of the inner liner is up to about 250 pounds per thousand square feet. In another and/or alternative non-limiting aspect of this embodiment, weight of the inner liner is at least about 25 pounds per thousand square feet. In still another and/or alternative non-limiting aspect of this embodiment, weight of the inner liner is about 25-200 pounds per thousand square feet. In yet another and/or alternative non-limiting aspect of this embodiment, weight of the inner liner is about 25-150 pounds per thousand square feet. In still yet another and/or alternative non-limiting aspect of this embodiment, weight of the inner liner is about 30-140 pounds per thousand square feet. In a further and/or alternative non-limiting aspect of this embodiment, weight of the inner liner is about 35-125 pounds per thousand square feet. In still a further and/or alternative non-limiting aspect of this embodiment, weight of the inner liner is about 40-120 pounds per thousand square feet. In yet a further and/or alternative non-limiting aspect of this embodiment, weight of the inner liner is about 50-100 pounds per thousand square feet. In still yet a further and/or alternative non-limiting aspect of this embodiment, weight of the inner liner is equal to or greater than the weight of the outer liner. In another and/or alternative non-limiting aspect of this embodiment, weight of the inner liner is equal to or greater than the weight of the intermediate or corrugated paper layer. In another and/or alternative non-limiting embodiment of the invention, the weight of the outer liner is generally at least about 1 pounds per thousand square feet. In one non-limiting aspect of this embodiment, the weight of the outer liner is up to about 200 pounds per thousand square feet. In another and/or alternative non-limiting aspect of this embodiment, weight of the outer liner is at least about 2 pounds per thousand square feet. In still another and/or alternative non-limiting aspect of this embodiment, weight of the outer liner is about 5-100 pounds per thousand square feet. In yet another and/or alternative non-limiting aspect of this embodiment, weight of the outer liner is about 5-85 pounds per thousand square feet. In still yet another and/or alternative non-limiting aspect of this embodiment, weight of the outer liner is about 10-80 pounds per thousand square feet. In a further and/or alternative non-limiting aspect of this embodiment, weight of the outer liner is about 10-70 pounds per thousand square feet. In still a further and/or alternative non-limiting aspect of this embodiment, weight of the outer liner is about 12-60 pounds per thousand square feet. In yet a further and/or alternative non-limiting aspect of this embodiment, weight of the outer liner is about 15-50 pounds per thousand square feet. In still yet a further and/or alternative non-limiting aspect of this embodiment, weight of the outer liner is equal to or less than the weight of the inner liner. In another and/or alternative non-limiting aspect of this embodiment, weight of the outer liner is equal to or less than the weight of the intermediate or corrugated paper layer. In still another and/or alternative non-limiting embodiment of the invention, the weight of the intermediate or corrugated paper layer is generally at least about 1 pounds per thousand square feet. In one non-limiting aspect of this embodiment, the weight of the intermediate or corrugated paper layer is up to about 200 pounds per thousand square feet. In another and/or alternative non-limiting aspect of this embodiment, weight of the intermediate or corrugated paper layer is at least about 3 pounds per thousand square feet. In still another and/or alternative non-limiting aspect of this embodiment, weight of the intermediate or corrugated paper layer is about 5-105 pounds per thousand square feet. In yet another and/or alternative non-limiting aspect of this embodiment, weight of the intermediate or corrugated paper layer is about 5-85 pounds per thousand square feet. In still yet another and/or alternative non-limiting aspect of this embodiment, weight of the intermediate or corrugated paper layer is about 10-80 pounds per thousand square feet. In a further and/or alternative non-limiting aspect of this embodiment, weight of the intermediate or corrugated paper layer is about 10-70 pounds per thousand square feet. In still a further and/or alternative non-limiting aspect of this embodiment, weight of the intermediate or corrugated paper layer is about 12-65 pounds per thousand square feet. In yet a further and/or alternative non-limiting aspect of this embodiment, weight of the intermediate or corrugated paper layer is about 15-55 pounds per thousand square feet. In yet another and/or alternative non-limiting embodiment of the invention, the weight of the inner liner is greater that the weight of the outer liner. It has been found that the when the inner liner has a thickness that is greater than the outer liner, the cost of the paper container can be reduced along with reducing the incidence of delaminating and deformation of the paper container. In one non-limiting aspect of this embodiment, the weight ratio of the inner liner to the outer liner is about 1.01-100:1. In another non-limiting aspect of this embodiment, the weight ratio of the inner liner to the outer liner is about 1.05-50:1. In still another non-limiting aspect of this embodiment, the weight ratio of the inner liner to the outer liner is about 1.1-20:1. In yet another non-limiting aspect of this embodiment, the weight ratio of the inner liner to the outer liner is about 1.15-10:1. In still yet another non-limiting aspect of this embodiment, the weight ratio of the inner liner to the outer liner is about 1.2-5:1. In a further non-limiting aspect of this embodiment, the weight ratio of the inner liner to the outer liner is about 1.3-3:1. In still a further non-limiting aspect of this embodiment, the weight ratio of the inner liner to the outer liner is about 1.3-2:1. In still yet another and/or alternative non-limiting embodiment of the invention, the weight of the intermediate or corrugated paper layer is less than the weight of the outer liner. In one non-limiting aspect of this embodiment, the weight ratio of outer liner to the intermediate or corrugated paper layer is about 1.01-50:1. In another non-limiting aspect of this embodiment, the weight ratio of the outer liner to the intermediate or corrugated paper layer is about 1.01-20:1. In still another non-limiting aspect of this embodiment, the weight ratio of the outer liner to the intermediate or corrugated paper layer is about 1.05-5:1. In yet another non-limiting aspect of this embodiment, the weight ratio of outer liner to the intermediate or corrugated paper layer is about 1.05-2:1. In still yet another non-limiting aspect of this embodiment, the weight ratio of outer liner to the intermediate or corrugated paper layer is about 1.2-2:1.

In still yet another and/or alternative non-limiting aspect of the invention, the upper surface of the inner liner includes one or more openings that are designed to allow liquids (e.g., water, oil. etc.) to at least partially drain from the upper surface of the inner liner and become trapped between the inner and outer liners. During the cooking of foods that include a bottom dough layer (e.g., pizza crust, pie crust, pot pie crust, bread, cakes, rolls, muffins, pastries, cookies, cupcakes, etc.), it is difficult to obtain the desired browning and dryness of the dough product on the base of the cooked dough product when not using metal containers. Various prior art plastic and paper containers have attempted to address this problem by including coatings that form a hotter surface during the cooking process. However, the oils used to grease the inner container surface and/or the moisture contained in the dough product can continue to interfere with the desired browning of the bottom of the dough, especially when the dough product is cooked in a non-metal container. For instance, it is not uncommon for the upper surface of a pizza pan to be pre-greased with up to about an ounce or two of cooking oil and the pizza dough can contain about 20-50 percent by weight liquid (e.g., water, oil, honey, etc.) prior to the cooking of the pizza. Furthermore, pizza toppings such as the pizza sauce, cheese, meat (e.g., sausage, pepperoni, ham, etc.), fruits (e.g., pineapple, tomatoes, etc.) and vegetables (e.g., onion, peppers, mushrooms, etc.) also can contain significant amounts of fluid (e.g., water, oil, etc.) that can be released from such ingredients during the cooking of the pizza. The inclusion of one or more openings in the upper surface of the inner liner allows liquids (e.g., water, oil, etc.) to at least partially drain from the upper surface of the inner liner and thereby be at least partially removed from contact with the bottom surface of the food product during the heating and/or cooking of the food product in the paper container. As a result, the bottom surface of the food product, especially food products that have a dough bottom surface, are better able to brown during the cooking of the food in the paper container. The shape of the openings is non-limiting (e.g., oval, circular, polygonal, elongated O-shaped, etc.). The shape of the openings can be the same or different on the upper surface of the inner liner. In one non-limiting embodiment of the invention, the upper surface of the inner liner includes a plurality of openings. The plurality of openings can be uniformly or non-uniformly positioned on the upper surface of the inner liner. If the inner liner includes a rim, the rim may or may not include one or more of the openings. In another and/or alternative non-limiting embodiment of the invention, the size and/or spacing of the openings is generally controlled so as to avoid adversely compromising the strength and/or integrity of the inner liner; however, the openings need to be large enough and present in sufficient quantities to enable liquid to flow through the openings in sufficient quantities to improve the cooking and/or browning of the food on the upper surface of the inner liner. In one non-limiting aspect of this embodiment, the average cross-sectional area of the openings is at least about 0.001 $in^2$. In another and/or alternative non-limiting aspect of this embodiment, the average cross-sectional area of the openings is up to about 0.2 $in^2$. In still another and/or alternative non-limiting aspect of this embodiment, the average cross-sectional area of the openings is at least about 0.0015 in$^2$. In yet another and/or alternative non-limiting aspect of this embodiment, the average cross-sectional area of the openings is about 0.0015-0.1 in$^2$. In yet another and/or alternative non-limiting aspect of this embodiment, the average cross-sectional area of the openings is about 0.002-0.06 in$^2$. In still yet another and/or alternative non-limiting aspect of this embodiment, the average cross-sectional area of the openings is about 0.002-0.03 in$^2$. In a further and/or alternative non-limiting aspect of this embodiment, the average cross-sectional area of the openings is about 0.002-0.02 in$^2$. In still a further and/or alternative non-limiting aspect of this embodiment, the average cross-sectional area of the openings is about 0.005-0.015 in$^2$. In another and/or alternative non-limiting aspect of this embodiment, the average spacing of the openings from one another is at least about 0.01 in. In still another and/or alternative non-limiting aspect of this embodiment, the average spacing of the openings from one another is up to about 2 in. In yet another and/or alternative non-limiting aspect of this embodiment, the average spacing of the openings from one another is at least about 0.03 in. In still yet another and/or alternative non-limiting aspect of this embodiment, the average spacing of the openings from one another is about 0.03-1 in. In a further and/or alternative non-limiting aspect of this embodiment, the average spacing of the openings from one another is about 0.04-0.5 in. In still a further and/or alternative non-limiting aspect of this embodiment, the average spacing of the openings from one another is about 0.1-0.4 in. In yet a further and/or alternative non-limiting aspect of this embodiment, the average spacing of the openings from one another is about 0.1875-0.375 in. In still another and/or alternative non-limiting embodiment of the invention, the openings in the inner liner constitute at least about 0.1% of the upper surface of the inner liner. In one non-limiting aspect of this embodiment, the openings in the inner liner constitute up to about 40% of the upper surface of the inner liner. In another non-limiting aspect of this embodiment, the openings in the inner liner constitute about 0.25-35% of the upper surface of the inner liner. In still another non-limiting aspect of this embodiment, the openings in the inner liner constitute about 0.5-30% of the upper surface of the inner liner. In yet another non-limiting aspect of this embodiment, the openings in the inner liner constitute about 1-25% of the upper surface of the inner liner. In still yet another non-limiting aspect of this embodiment, the openings in the inner liner constitute about 1-20% of the upper surface of the inner liner. In still another and/or alternative non-limiting embodiment of the invention, a majority or all of the one or more openings do not fully penetrate the outer liner. In this design of the paper container, most or all of the liquid that passes through one or more openings in the inner liner become trapped between the inner liner and the outer liner. As a result, undesirable liquids (e.g., oil, grease, etc.) do not accumulate on or drip from the lower surface of the outer liner. Consequently, little, if any, liquid is present on the lower surface of the outer liner, thus the handling of the paper container after the food is heated or cooked does not cause a mess or burns, and/or does not cause a mess when the container is placed on another surface. In one non-limiting aspect of this embodiment, over 60 percent of the openings in the upper surface of the inner liner do not fully penetrate the outer liner. In another and/or alternative non-limiting aspect of this embodiment, over 75 percent of the openings in the upper surface of the inner liner do not fully penetrate the outer liner. In still another and/or alternative non-limiting aspect of this embodiment, over 80 percent of the openings in the upper surface of the inner liner do not fully penetrate the outer liner. In yet another and/or alternative non-limiting aspect of this embodiment, over 90 percent of the openings in the upper surface of the inner liner do not fully penetrate the outer liner. In still yet another and/or alternative non-limiting aspect of this embodiment, over 95 percent of the openings in the upper surface of the inner liner do not fully penetrate the outer liner. In a further and/or alternative non-limiting aspect of this embodiment, about 100 percent of the openings in the upper surface of the inner liner do not fully penetrate the outer liner. In another and/or alternative non-limiting aspect of this embodiment, at least about 60 percent of the liquid that passes through one or more openings in the upper surface of the inner liner does not fully pass through the outer liner. In still another and/or alternative non-limiting aspect of this embodiment, at least about 75 percent of the liquid that passes through one or more openings in the upper surface of the inner liner does not fully pass through the outer liner. In yet another and/or alternative non-limiting aspect of this embodiment, at least about 80 percent of the liquid that passes through one or more openings in the upper surface of the inner liner does not fully pass through the outer liner. In still yet another and/or alternative non-limiting aspect of this embodiment, at least about 85 percent of the liquid that passes through one or more openings in the upper surface of the inner liner does not fully pass through the outer liner. In a further and/or alternative non-limiting aspect of this embodiment, at least about 90 percent of the liquid that passes through one or more openings in the upper surface of the inner liner does not fully pass through the outer liner. In still a further and/or alternative non-limiting aspect of this embodiment, at least about 95 percent of the liquid that passes through one or more openings in the upper surface of the inner liner does not fully pass through the outer liner. In yet a further and/or alternative non-limiting aspect of this embodiment, all of the liquid that passes through one or more openings in the upper surface of the inner liner does not fully pass through the outer liner.

In another and/or alternative non-limiting aspect of the invention, the paper container includes a rim that extends upwardly from the upper surface of the inner liner. The rim generally forms all or at least a majority of the outer peripheral side of the container. The angle that is formed between the upper surface of the inner liner and inner surface of the rim is non-limiting. The height at which the rim extends upwardly from the upper surface of the inner rim is also non-limiting. Generally, there is no seam between the upper surface of the inner liner and the rim; however, this is not required. In one non-limiting embodiment of the invention, the paper container is formed so that there is no seam between the upper surface of the inner liner and the rim. The absence of a seam between the upper surface of the inner liner and the rim reduces or prevents liquids for seeping through a seam and to the outer surface of the rim or lower surface of the outer liner. The forming of the paper container without a seam between the upper surface of the inner liner and the rim can be accomplished by forming a portion of the inner liner into the rim. As such, when the upper surface of the inner liner, prior to forming, is absent a seam, the subsequent forming of the inner liner to create a rim results in a seamless transition between the upper surface of the formed inner liner and the formed rim. As can be appreciated, the rim can also be at least partially made of a formed portion of the intermediate or corrugated paper layer and/or a formed portion of the outer liner; however, this is not required. In another and/or alternative non-limiting embodiment of the invention, the rim extends at least about 0.1 inch above the upper surface of the inner liner. In one non-limiting aspect of this embodiment, the rim extends up to about 5 inches above the upper surface of the inner liner. In another and/or alternative non-limiting aspect of this embodiment, the rim extends about 0.2 to 3 inches above the upper surface of the inner liner. In still another and/or alternative non-limiting aspect of this embodiment, the rim extends about 0.25 to 2 inches above the upper surface of the inner liner. In yet another and/or alternative non-limiting aspect of this embodiment, the rim extends about 0.5 to 1.5 inches above the upper surface of the inner liner. In still another and/or alternative non-limiting embodiment of the invention, the angle between the upper surface of the inner liner and at least a portion of the inner surface of the rim is about 5°-120°. In one non-limiting aspect of this embodiment, the angle between the upper surface of the inner liner and at least a portion of the inner surface of the rim is about 10°-90°. In another non-limiting aspect of this embodiment, the angle between the upper surface of the inner liner and at least a portion of the inner surface of the rim is about 25°-90°. In still another non-limiting aspect of this embodiment, the angle between the upper surface of the inner liner and at least a portion of the inner surface of the rim is about 45°-90°. In still yet another and/or alternative non-limiting embodiment of the invention, the outer edge of the rim is rolled. Typically, the rim, when rolled, is rolled outwardly from the interior of the paper container; however, this is not required. The rolled rim has been found to facilitate in maintaining the integrity of the paper container and to reduce the incidence of delamination of one or more layers of the paper container during the heating or cooking of food. The rolled rim, when rolled outwardly, can also facilitate in the handling of the paper container and/or be used to connect to a lid when a lid is used; however, this is not required. In still another and/or alternative non-limiting aspect of the present invention, two or more of the layers of the paper container are at least partially held together by an adhesive. The same or different types of adhesives can be used in the container. When more than one type of adhesive is used, the different types of adhesive can be used in the same or differing locations on the paper container. As defined herein, an adhesive is not a polymeric material. A polymeric material can perform a bonding function when the polymeric material is heated to or above its softening or melting point to cause the plastic or polymeric material to bond to one or more paper substrates in the inner liner, outer liner and/or corrugated layer. In one non-limiting embodiment of the invention, the one or more layers of corrugated paper layers are primarily secured to the inner liner and/or outer liner by an adhesive. In some prior art containers, the container includes a polymeric layer embedded between two or more layers of paper. In some other prior art containers, a layer of polymeric material encapsulates one or more paper layers. In addition, some other prior art containers have a polymeric layer that is both embedded between two or more layers of paper and encapsulates one or more paper layers. In all of these prior art containers, the polymeric layer is used as the principal component of the container to maintain the shape of the container and to bind the multiple paper layers together. The paper container of the present invention deviates from these past paper containing containers in that the paper container of the present invention may include a polymeric layer; however, the polymeric layer, if used, is not used as the principal agent to bond the layers of the paper container together. Generally, when the paper container of the present invention includes a polymeric coating, such polymeric coating is a thin layer coating positioned in the upper surface of the inner liner that is principally used to inhibit or prevent food from sticking to the upper surface of the inner liner. In still another and/or alternative non-limiting embodiment of the present invention, the type of adhesive used in the paper container of the present invention is non-limiting. The adhesive can be a biodegradable and/or non-biodegradable adhesive. One non-limiting type of adhesive that can be used is a natural adhesive. Natural adhesives, when used, are commonly made from inorganic mineral sources, or biological sources such as vegetable matter, starch and/or modified starch (e.g., dextrin, etc.), natural resins, animals (e.g., casein, animal glue, etc.), or blood albumen (made from protein component of blood). Another type of adhesive that can be used is a synthetic adhesive. Non-limiting examples of synthetic adhesives include anaerobic adhesives (e.g., synthetic acrylic resins, etc.), cyanoacrylate adhesives (e.g., acrylic resin, etc.), toughened acrylic adhesives, epoxy adhesives, polyurethane adhesives, silicone adhesives, phenolics adhesives, polyimide adhesives, hot melt adhesives (e.g., thermoplastic materials, etc.), plastisol adhesives (e.g., modified PVC dispersions), rubber adhesives, polyvinyl Acetate (PVA's) adhesives, pressure sensitive adhesives, and various types of elastomers and emulsions. Adhesives that include polymeric materials can also or alternatively be used. For purposes of the present invention, the above identified adhesives are considered adhesives and not polymeric material for the present invention. For purposes of this invention, the following polymeric materials are not considered adhesives, namely rubber, synthetic rubber, bakelite, neoprene, nylon, PVC, PET, PMP, polystyrene, polyethylene, polypropylene, polyacrylonitrile, PVB, and silicone. In another non-limiting embodiment of the invention, the adhesive can include polymeric material. When polymeric material is included in the adhesive, the content of polymeric material is generally no more than about 90 weight percent of the adhesive material, typically no more than about 75 weight percent of the adhesive material, more typically no more than about 60 weight percent of the adhesive material, still even more typically no more than about 50 weight percent of the adhesive material, and still even more typically no more than about 40 weight percent of the adhesive material. In one non-limiting aspect of this embodiment, the adhesive includes a starch and/or synthetic starch. In one non-limiting configuration of the paper container, starch and/or synthetic starch are the primary and principle adhesives used in the paper container. In another and/or alternative non-limiting aspect of this embodiment, the adhesive that is used in the paper container is at least partially included in the paper that at least partially forms the inner liner, the outer liner and/or the one or more intermediate or corrugated paper layers; however, this is not required. As can be appreciated, all or a portion of the adhesive can be included in the paper that at least partially forms the inner liner, the outer liner and/or the one or more corrugated paper layers. In one non-limiting aspect of the invention, at least about 5% of the adhesive used in the paper container is included in the paper that forms the inner liner, the outer liner and/or the one or more intermediate or corrugated paper layers. In another non-limiting aspect of the invention, at least about 10% of the adhesive used in the paper container is included in the paper that forms the inner liner, the outer liner and/or the one or more intermediate or corrugated paper layers. In still another non-limiting aspect of the invention, at least about 25% of the adhesive used in the paper container is included in the paper that forms the inner liner, the outer liner and/or the one or more intermediate or corrugated paper layers. In yet another non-limiting aspect of the invention, at least about 50% of the adhesive used in the paper container is included in the paper that forms the inner liner, the outer liner and/or the one or more intermediate or corrugated paper layers. In still yet another non-limiting aspect of the invention, at least about 75% of the adhesive used in the paper container is included in the paper that forms the inner liner, the outer liner and/or the one or more intermediate or corrugated paper layers. In another non-limiting aspect of the invention, at least about 90% of the adhesive used in the paper container is included in the paper that forms the inner liner, the outer liner and/or the one or more intermediate or corrugated paper layers. In still another non-limiting aspect of the invention, at least about 95% of the adhesive used in the paper container is included in the paper that forms the inner liner, the outer liner and/or the one or more intermediate or corrugated paper layers. In yet another non-limiting aspect of the invention, about 100% of the adhesive used in the paper container is included in the paper that forms the inner liner, the outer liner and/or the one or more intermediate or corrugated paper layers.

In yet another and/or alternative non-limiting aspect of the present invention, the paper container does not include a polymeric layer that encapsulates one or more of the paper layers of the paper container. As such, the paper container of this embodiment of the invention is designed to include less polymeric material than past paper containers, thereby making the paper container more environmentally friendly.

In still yet another and/or additional non-limiting aspect of the present invention, the paper container does not include a polymeric layer that is positioned between two or more paper layers of the paper container. As such, the paper container of this embodiment of the invention is designed to include less polymeric material than past paper containers, thereby making the paper container more environmentally friendly.

In another and/or alternative non-limiting aspect of the present invention, the inner liner of the paper container includes a polymeric layer on the upper surface of the inner liner. In one non-limiting embodiment, the polymeric layer, when used, is only coated on the upper surface of the inner liner and optionally on the inner surface of a rim, when a rim is formed. In this non-limiting embodiment, the polymeric layer is not used to bind the majority of inner and outer liners together or to bind a majority of the one or more intermediate or corrugated paper layers to the inner liner and/or outer liner. Although the paper container of the present invention is generally designed to only include one or more polymeric coatings on the upper surface of the inner liner and/or optionally on the inner surface of a rim when a rim is formed on the container, it will be appreciated that the container can include one or more polymeric coatings between two or more layers of the container (i.e., between the inner and outer liners, etc.) and/or positioned on the lower surface of the outer liner and/or optionally on the outer surface of a rim when a rim is formed on the container. In one non-limiting configuration, a polymeric coating can be included in the lower surface of the outer liner so as to facilitate in the printing of material (e.g., advertisements, directions, etc.) on the lower surface of the outer liner; however, this is not required. Non-limiting examples of polymeric coatings that can be used on the upper surface of the inner liner include one or more polymers such as polymethylpentene (PMP), styrene-acrylic latex copolymers, polyesters such as polyethylene terephthalate (PET) and polybutylene terephthalate (PBT), polyolefins (e.g., polyethylene, polypropylene, polyethylene-polypropylene copolymers, and polybutylene), polyimides, polyamides, urethanes, silicones, polysulfones, and/or the like. Optionally, the polymeric coating also can include one or more adjuvants/additives/layers to improve the physical and/or mechanical properties of the inner liner of the paper container. These polymeric materials are not considered adhesives for purposes of the present invention. When one or more polymeric coatings are included on the paper container, the thickness of the polymeric coating is generally less than the thickness of the paper substrate used in the inner liner; however, this is not required. In one non-limiting embodiment of the invention, the coating weight of one or more of the polymeric coatings used in/on the paper container, if such polymeric coatings are used, is at least about 0.05 P/MSF (pounds per thousand square feet). In one non-limiting aspect of this embodiment, the coating weight of one or more of the polymeric coatings used in/on the paper container, if such polymeric coatings are used, is up to about 40 P/MSF. In another non-limiting aspect of this embodiment, the coating weight of one or more of the polymeric coatings used in/on the paper container, if such polymeric coatings are used, is about 0.1-30 P/MSF. In still another non-limiting aspect of this embodiment, the coating weight of one or more of the polymeric coatings used in/on the paper container, if such polymeric coatings are used, is about 0.1-20 P/MSF. In yet another non-limiting aspect of this embodiment, the coating weight of one or more of the polymeric coatings used in/on the paper container, if such polymeric coatings are used, is about 0.5-20 P/MSF. In still yet another non-limiting aspect of this embodiment, the coating weight of one or more of the polymeric coatings used in/on the paper container, if such polymeric coatings are used, is about 1-15 P/MSF. In another non-limiting aspect of this embodiment, the coating weight of one or more of the polymeric coatings used in/on the paper container, if such polymeric coatings are used, is about 2-12 P/MSF.

In still another and/or alternative non-limiting aspect of the invention, the paper container can include one or more heat enhancing components to facilitate in the heating or cooking of food in the paper container; however, this is not required. In one non-limiting embodiment of the invention, the polymeric material that is included on the upper surface of the inner liner includes metal particles that are used to increase heat conductance and/or surface temperature between the inner liner and the food located on the upper surface of the inner liner. As can be appreciated, one or more polymeric coatings that include metal particles can be coated on other or additional portions of the paper container. The pattern of the metal particles can be uniform or non-uniform in the polymeric material. In another non-limiting embodiment of the invention, the container can include one or more metal layers and/or coatings that are used to increase heat conductance and/or surface temperature between the inner liner and the food located on the upper surface of the inner liner. The one or more metal layers can be included on the inner liner, outer liner and/or corrugated paper layer.

In yet another and/or alternative non-limiting aspect of the invention, the upper surface of the inner liner can include one or more non-smooth surfaces (e.g., ribs, mounds, divots, indentions, etc.); however, this is not required. These one or more non-smooth surfaces can be used to a) facilitate in cooking and/or browning the bottom surface of a food in the paper container, b) enable separation of the food in the paper container from liquid that collects on the upper surface of the inner liner during the heating or cooking of food in the paper container so as to reduce sogginess of the food, improve the cooking of the food and/or improve the browning of the food, c) facilitate in directing liquid on the upper surface of the inner liner into the one or more openings in the inner liner, when such openings exist, so as to remove or reduce liquid contact with the food in the paper container during the heating or cooking of the food, d) increase the strength and/or rigidity of the inner liner, e) create a convection heating effect on the bottom surface of a food in the paper container during the heating or cooking of the food, and/or f) increase the rate of cooling of the inner and/or outer liner after the food is removed from an oven and/or the like so that the outer liner can be more quickly handled by a user. When the upper surface of the inner liner includes a plurality of non-smooth surfaces, the distribution or density of the non-smooth surface on the upper surface of the inner liner can be uniform or non-uniform. In one non-limiting embodiment of the invention, at least about 1% of the upper surface of the inner liner includes one or more non-smooth surfaces. In one non-limiting aspect of this embodiment, at least about 5% of the upper surface of the inner liner includes one or more non-smooth surfaces. In another non-limiting aspect of this embodiment, at least about 10% of the upper surface of the inner liner includes one or more non-smooth surfaces. In still another non-limiting aspect of this embodiment, at least about 20% of the upper surface of the inner liner includes one or more non-smooth surfaces. In yet another non-limiting aspect of this embodiment, at least about 25% of the upper surface of the inner liner includes one or more non-smooth surfaces. In still yet another non-limiting aspect of this embodiment, at least about 30% of the upper surface of the inner liner includes one or more non-smooth surfaces. In another non-limiting aspect of this embodiment, at least about 40% of the upper surface of the inner liner includes one or more non-smooth surfaces. In still another non-limiting aspect of this embodiment, a majority of the upper surface of the inner liner includes one or more non-smooth surfaces. In yet another non-limiting aspect of this embodiment, up to 95% of the upper surface of the inner liner includes one or more non-smooth surfaces. In still yet another non-limiting aspect of this embodiment, up to 90% of the upper surface of the inner liner includes one or more non-smooth surfaces. In another non-limiting aspect of this embodiment, up to 80% of the upper surface of the inner liner includes one or more non-smooth surfaces. In still another non-limiting aspect of this embodiment, up to 75% of the upper surface of the inner liner includes one or more non-smooth surfaces. In still yet another and/or alternative non-limiting aspect of the invention, there is provided a method of making an ovenable paper container. The method includes the step of forming one or more layers of the paper container by the use of heat and pressure. In one non-limiting embodiment of the invention, one or more layers of the paper container are at least partially formed into the paper container of the present invention by compressing the one or more layers of the paper container and applying heat and/or steam to the one or more layers at least partially while being compressed. In one non-limiting aspect of the present invention, the heat, during the forming process, can be partially or fully supplied by the steam, when steam is used during the forming process. In another and/or alternative non-limiting embodiment of the invention, the one or more corrugated layers of the paper container that are positioned between the inner liner and the outer liner are not uniformly compressed during the forming of the container. The non-uniform compression of the one or more corrugated paper layers has been found to result in a paper container that resists deformation and delamination during the heating and the cooking of foods, provides the desired heat insulating features of the paper container when the paper container is removed from an oven, and/or results in the desired heating and cooking of the food in the paper container. In one non-limiting aspect of this embodiment, the paper container includes a rim and the transition region between the rim and the bottom of the paper container is compressed more that the bottom of the paper container. The transition region is the region between the generally flat upper surface of the inner liner and the generally flat surface of the inner wall surface of the rim. The transition region is generally a curved region; however, this is not required. In one non-limiting design, the one or more corrugated paper layers in this transition region and/or rim are crushed during the forming process such that over 40 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. Generally the height of the flutes of the one or more layers of corrugated paper have an average height of about 1-8 mm prior to being subjected to compressive forces in the paper container forming process. In another and/or alternative non-limiting design, the one or more corrugated paper layers in this transition region and/or rim are crushed during the forming process such that over 50 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. In still another and/or alternative non-limiting design, the one or more corrugated paper layers in this transition region and/or rim are crushed during the forming process such that over 60 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. In yet another and/or alternative non-limiting design, the one or more corrugated paper layers in this transition region and/or rim are crushed during the forming process such that over 75 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. In yet another and/or alternative non-limiting design, the one or more corrugated paper layers in this transition region and/or rim are crushed during the forming process such that over 80 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about percent of the original height of the flutes. In still yet another and/or alternative non-limiting design, the one or more corrugated paper layers in this transition region and/or rim are crushed during the forming process such that over 90 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. In a further and/or alternative non-limiting design, the one or more corrugated paper layers in this transition region and/or rim are crushed during the forming process such that over 95 percent of the flutes of the one or more corrugated paper layers have been crushed to less than 60 percent of the original height of the flutes, more typically to less than about 50 percent of the original height of the flutes, more typically less than about 40 percent of the original height of the flutes, and even more typically to less than about 30 percent of the original height of the flutes, and still even more typically to less than about 25 percent of the original height of the flutes, and still yet even more typically to less than about 20 percent of the original height of the flutes, and further even more typically to less than about 10 percent of the original height of the flutes, and still further even more typically to less than about 5 percent of the original height of the flutes. In another and/or alternative aspect of this design, all or part of the rim of the formed paper that is located above the transition region is also compressed. The amount of compression of the rim can be less than, the same as or greater than the amount of compression at the transition region. In one non-limiting design, the average height ratio of the flutes of the one or more corrugated paper layers in the transition region and/or rim to the flutes in the other regions of the container is about 0.001-0.95:1. In another non-limiting design, the average height ratio of the flutes of the one or more corrugated paper layers in the transition region and/or rim to the flutes in the other regions of the container is about 0.001-0.9:1. In still another non-limiting design, the average height ratio of the flutes of the one or more corrugated paper layers in the transition region and/or rim to the flutes in the other regions of the container is about 0.001-0.8:1. In another non-limiting design, the average height ratio of the flutes of the one or more corrugated paper layers in the transition region and/or rim to the flutes in the other regions of the container is about 0.001-0.7:1. In another non-limiting design, the average height ratio of the flutes of the one or more corrugated paper layers in the transition region and/or rim to the flutes in the other regions of the container is about 0.001-0.6:1. Generally, the average height is at least about 30 percent of the flutes of the one or more corrugated paper layers in regions of the paper container other than the transition region and/or rim after the forming process is no more than about 20 percent of the original height of the flutes, typically no more than about 30 percent of the original height of the flutes, more typically no more than about 40 percent of the original height of the flutes, still more typically no more than about 50 percent of the original height of the flutes, yet more typically no more than about 60 percent of the original height of the flutes, still yet more typically no more than about 70 percent of the original height of the flutes, and even more typically no more than about 80 percent of the original height of the flutes. In another non-limiting configuration, the average height at least about 40 percent of the flutes of the one or more corrugated paper layers in regions of the paper container other than the transition region and/or rim after the forming process is no more than about 20 percent of the original height of the flutes, typically no more than about 30 percent of the original height of the flutes, more typically no more than about 40 percent of the original height of the flutes, still more typically no more than about 50 percent of the original height of the flutes, yet more typically no more than about 60 percent of the original height of the flutes, still yet more typically no more than about 70 percent of the original height of the flutes, and even more typically no more than about 80 percent of the original height of the flutes. In still another non-limiting configuration, the average height at least about 50 percent of the flutes of the one or more corrugated paper layers in regions of the paper container other than the transition region and/or rim after the forming process is no more than about 20 percent of the original height of the flutes, typically no more than about 30 percent of the original height of the flutes, more typically no more than about 40 percent of the originally height of the flutes, still more typically no more than about 50 percent of the original height of the flutes, yet more typically no more than about 60 percent of the original height of the flutes, still yet more typically no more than about 70 percent of the original height of the flutes, and even more typically no more than about 80 percent of the original height of the flutes. In yet another non-limiting configuration, the average height at least about 60 percent of the flutes of the one or more corrugated paper layers in regions of the paper container other than the transition region and/or rim after the forming process is no more than about 20 percent of the originally height of the flutes, typically no more than about 30 percent of the original height of the flutes, more typically no more than about 40 percent of the original height of the flutes, still more typically no more than about 50 percent of the original height of the flutes, yet more typically no more than about 60 percent of the original height of the flutes, still yet more typically no more than about 70 percent of the original height of the flutes, and even more typically no more than about 80 percent of the original height of the flutes. In still yet another non-limiting configuration, the average height at least about 70 percent of the flutes of the one or more corrugated paper layers in regions of the paper container other than the transition region and/or rim after the forming process is no more than about 20 percent of the original height of the flutes, typically no more than about 30 percent of the original height of the flutes, more typically no more than about 40 percent of the original height of the flutes, still more typically no more than about 50 percent of the original height of the flutes, yet more typically no more than about 60 percent of the original height of the flutes, still yet more typically no more than about 70 percent of the original height of the flutes, and even more typically no more than about 80 percent of the original height of the flutes.

In another and/or alternative non-limiting aspect of the invention, there is provided a method for forming an ovenable paper container including the steps of providing an inner liner containing a paper substrate and optionally a polymeric coating on the upper surface of the inner liner, an outer liner containing a paper substrate, and an intermediate or corrugated paper layer positioned between the inner liner and the outer liner; die cutting the inner liner, outer liner and corrugated paper layer into a shape; and forming the die cut shapes into the ovenable paper container under mechanical pressure and optionally heat and/or steam.

In still another and/or alternative non-limiting aspect of the invention relating to a method of using an ovenable paper container involving charging a food product into the ovenable paper container, and heating the ovenable paper container containing the food product in an oven.

It is one non-limiting object of the present invention to provide an improved ovenable paper container.

It is another and/or alternative non-limiting object of the present invention to provide an ovenable paper container that can be used to cook and/or heat food in an oven and which enables a user to handle the ovenable paper container immediately after or shortly after the ovenable paper container has been removed from an oven.

It is still another and/or alternative non-limiting object of the present invention to provide an ovenable paper container that is a thermoformed container.

It is yet another and/or alternative non-limiting object of the present invention to provide an ovenable paper container that provides insulation to the fingers or the hand of a user from the heated food in the container thereby reducing discomfort and/or injury to the user.

It is still yet another and/or alternative non-limiting object of the present invention to provide an ovenable paper container that completely or primarily uses an adhesive to connect the inner liner, outer liner and corrugated paper layer together.

It is a further and/or alternative non-limiting object of the present invention to provide an ovenable paper container that includes a rim.

It is still a further and/or alternative non-limiting object of the present invention to provide an ovenable paper container that has increased strength and/or durability and which resists delamination during the cooking and/or heating of food.

It is yet a further and/or alternative non-limiting object of the present invention to provide an ovenable paper container wherein the intermediate or corrugated paper layer in the transition region and/or rim of the container is more compressed than in other regions of the container.

It is still yet a further and/or alternative non-limiting object of the present invention to provide an ovenable paper container that has a bent or rolled rim.

It is another and/or alternative non-limiting object of the present invention to provide an ovenable paper container that includes a polymeric coating on the upper surface of the inner liner.

It is still another and/or alternative non-limiting object of the present invention to provide an ovenable paper container that includes non-smooth surfaces on the upper surface of the inner liner.

It is yet another and/or alternative non-limiting object of the present invention to provide an ovenable paper container that includes one or more openings in the upper surface of the inner liner.

It is still yet another and/or alternative non-limiting object of the present invention to provide an ovenable paper container that includes one or more openings in the upper surface of the inner liner and which one or more of the openings does not fully penetrate the intermediate or corrugated paper layer and/or outer liner.

It is another and/or alternative non-limiting object of the present invention to provide an ovenable paper container that includes a lid, or can have a lid attached to the paper container so as to enclose food within the paper container.

These and other advantages will become apparent to those skilled in the art upon the reading and following of this description taken together with the accompanying drawings.

BRIEF SUMMARY OF THE DRAWINGS

Reference may now be made to the drawings, which illustrate various non-limiting embodiments that the invention may take in physical form and in certain parts and arrangements of parts wherein.

DETAILED DESCRIPTION OF THE INVENTION

Figure 1:
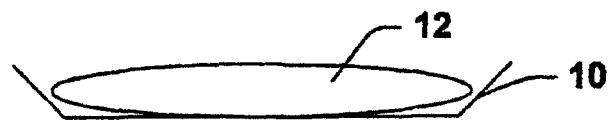
FIG. 1 is a cross-sectional side view of an ovenable paper container holding a food item in accordance with the present invention.
Figure 2:
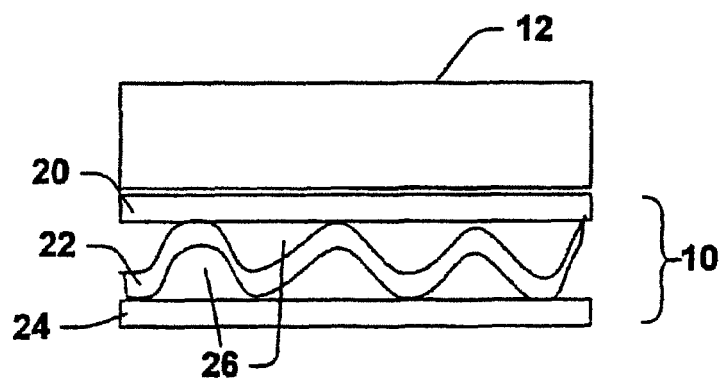
FIG. 2 is a cross-sectional side view of a portion of the ovenable paper container of FIG. 1.
Figure 3:
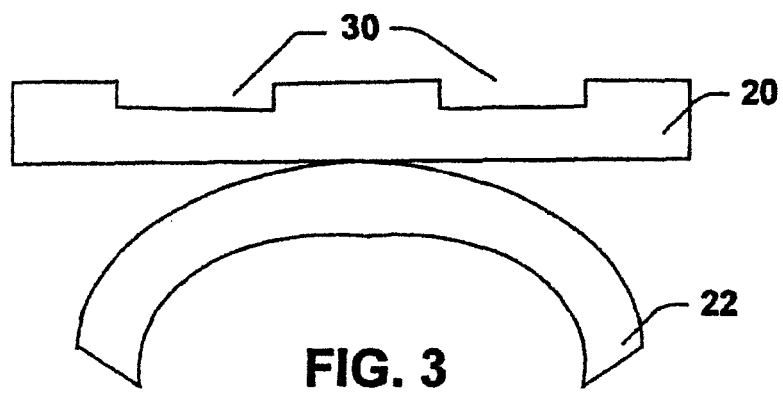
FIG. 3 is another cross-sectional side view of an ovenable paper container in accordance with the present invention.

Referring now to the drawings wherein the showings are for the purpose of illustrating non-limiting embodiments of the invention only and not for the purpose of limiting same, FIGS. 1-5 and 8-13 illustrate an ovenable paper container 10 in accordance with the present invention. Referring now to FIGS. 1-3, there is illustrated an ovenable paper container 10 that is made from sheets of a corrugated paper composite. The corrugated paper composite contains at three layers; namely, a food contact layer or inner liner 20, an intermediate or corrugated layer 22, and an outer liner 24. The outer liner 24 may have a printable surface; however, this is not required. The corrugated paper composite may contain additional layers; however, this is not required. Each of the three layers of the corrugated paper composite typically contains one or more layers of paper substrate. The inner liner 20 can have a polymeric coating on the upper surface of the inner liner, not shown; however, this is not required. The intermediate or corrugated layer 22 is typically formed of one or more layers of corrugated paper substrate that may or may not be treated The outer liner 24 can be y treated so that it has a printable surface, not shown; however, this is not required. The inner liner, intermediate layer, and outer liner generally are adhered to one another using an adhesive, not shown; however, it can be appreciated that other or alternative arrangements can be use to secure together one or more of the layers of the ovenable paper container 10.

The paper substrate that is used in one or more of the layers of the ovenable paper container can be made of cellulosic materials. Examples of cellulosic materials include, but are not limited to, Kraft paper, virgin Kraft paper, sulfite paper, recycled paper, and the like. Bleached or unbleached paper substrate may be employed. Paper substrates that can be used in the ovenable paper container are available from a number of sources including, but not limited to, Mead/Westvaco Corporation, Georgia Pacific, International Paper, Interstate, Caraustar, and the like.

The upper or top surface of the inner liner 20 of the ovenable paper container 10 is a food contact surface that can be used to support a variety of different foods 12 (e.g., pizzas, pies, pastries, etc.). This food contact surface can include a polymeric coating, not shown, which contacts a food product 12 that is subsequently held within the ovenable paper container 10. As can be appreciated, the polymeric coating, when used, can be coated on other portions of the inner liner (e.g., bottom surface, etc.) and/or on the outer liner and/or the corrugated layer; however, this is not required. The cellulosic material or paper substrate for the inner liner 20 is generally of a weight/size sufficient to support a polymeric coating and contain optional embossing 30 as illustrated in FIG. 3. The cellulosic material or paper substrate for the inner liner 20 is selected to have good resistance to conventional and/or microwave oven heating, as well as to low levels of contaminants which may inhibit adhesion of the polymeric coating, when such coating is used.

In one non-limiting arrangement, the inner liner (with polymeric coating) has a weight of about 25-150 pounds per thousand square feet (P/MSF). In another non-limiting arrangement, the inner liner (with polymeric coating) has a weight of about 35-125 P/MSF. In yet another non-limiting arrangement, the inner liner (with polymeric coating) has a weight of about 50-100 P/MSF.

The polymeric coating of the inner liner 20 can be formulated to mitigate heat-induced warpage of the subsequently formed ovenable paper container; however, this is not required. The polymeric coating generally is formulated to provide the ovenable paper container with food release properties. Examples of polymeric coatings include, but are not limited to, polymethylpentene (PMP), styrene-acrylic latex copolymers, polyesters such as polyethylene terephthalate (PET) and polybutylene terephthalate (PBT), and polyolefins such as polyethylene, polypropylene, polyethylene-polypropylene copolymers, and polybutylene, polyimides, polyamides, urethanes, silicones, polysulfones, and the like. Optionally, the polymeric coating also contains one or more adjuvants/additives/layers for improving the physical and/or mechanical properties of the ovenable corrugated paper container.

The polymeric coating may be applied to a paperboard substrate in any suitable manner. Examples include extrusion/coextrusion, spraying, pouring, dipping, immersing, molding, and the like.

The polymeric coating may be applied to a paperboard substrate via extrusion optionally incorporating unique tie resins, oil and grease barrier resin layers, and the like. The extrusion laminate is directly applied to the paperboard substrate via conventional extrusion techniques at conventional extrusion coating temperatures. The polymeric coating layer can be extruded as a single layer, or part of a multi-layer coextrusion with a barrier layer which enhances the oil and grease resistance of the coating; however, this is not required. Optionally binding the oil and grease barrier layer to the polymeric layer is a tie resin.

In one non-limiting arrangement, the inner liner 20 is a paperboard based laminate structure having a paperboard substrate and a PMP layer thereon. The PMP is extruded, brushed and/or spayed onto the paperboard substrate. The paperboard may be preheated or subject to corona discharge treatment just prior to the coating process in order to improve adhesion; however, this is not required. The paperboard may also be moistened prior to the coating process; however, this is not required.

In another non-limiting arrangement, the inner liner 20 is a paperboard based structure having a paperboard substrate and a five layer polymeric coating thereon. The five layer polymeric coating is made up of a first layer of PMP which is in direct contact with the paperboard substrate, a first tie layer adjacent the first PMP layer, the first tie layer binding an oil and grease barrier layer to first PMP layer. Placed adjacent the oil and grease barrier layer is a second tie layer and then a food contact layer or second PMP layer. The entire polymeric structure in this embodiment makes up the five-layer polymeric coating. This five layer polymeric coating can be coextruded onto the paper substrate or applied to the paper substrate by other or additional coating processes.

Any suitable oil and grease barrier resin can be selected for the subject invention such as, but not limited to, polyamide resins, copolyamide resins such as the nylon resins, polyester resins or copolyester resins. Additionally, the tie resin suitable for the subject invention may be a chemically modified graft copolymers of methylpentene; however, this is not required.

In yet another non-limiting arrangement, the inner liner 20 is a paperboard based structure that includes a three-layer polymeric coating coated on the paperboard substrate. The three-layer polymeric coating generally contains an oil and grease barrier layer next to the paperboard substrate, an adhesive tie resin layer on the barrier layer, and a layer of PMP which acts as the food contact layer. An example of a commercially available PMP polymer resin is TPX manufactured by Mitsui Petrochemical Corporation. The paperboard may be preheated or subject to corona discharge treatment just prior to the coating of the polymeric layer on to the paperboard substrate in order to improve adhesion; however, this is not required. The paperboard may also be moistened prior to the coating process; however, this is not required.

In still yet another non-limiting arrangement, the inner liner 20 is a paperboard based structure having a paperboard substrate and a PET layer thereon. The PET is can be extruded onto the paperboard substrate; however, this is not required. The paperboard may be preheated or subject to corona discharge treatment just prior to the coating of the polymeric layer on to the paperboard substrate in order to improve adhesion; however, this is not required. The paperboard may also be moistened prior to the coating process; however, this is not required.

In still yet another non-limiting arrangement, the inner liner 20 is a paperboard based structure having a paperboard substrate and a PBT layer thereon. The PBT can be extruded onto the paperboard substrate; however, this is not required. The paperboard may be preheated or subject to corona discharge treatment just prior to the coating of the polymeric layer on to the paperboard substrate in order to improve adhesion. The paperboard may also be moistened prior to the coating process; however, this is not required.

In another non-limiting arrangement, the inner liner 20 includes a paperboard substrate coated with an aqueous coating composition containing at least one styrene-acrylic latex copolymer. The aqueous coating composition may optionally further contain a stearate and/or a silicone. The aqueous coating composition may also be applied to the surface of other coatings; however, this is not required. The aqueous coating formulations can contain water; an aqueous latex containing a relatively soft free carboxyl group-containing styrene-acrylic resin having a low glass transition temperature ($T_g$) from about 20° C. to about 80° C.; and/or an aqueous latex containing a relatively hard carboxyl group-containing styrene-acrylic resin having a high glass transition temperature ($T_g$) from about 55° C. to about 80° C. A non-limiting example of a low $T_g$ carboxyl group-containing styrene-acrylic latex is B. F. Goodrich's Carboset XPD-1103, ($T_g$ of about 20° C.), whereas an exemplary high $T_g$ carboxyl group-containing styrene-acrylic latex is B. F. Goodrich's Carboset XPD-1105, ($T_g$ of about 55° C.). The relative amounts of low and high $T_g$ styrene-acrylic latexes that are used are dependent upon the particular latexes that are employed.

In one non-limiting formulation, the aqueous coating composition contains from about 0 to about 100 wt. % low $T_g$ styrene-acrylic latex (based on the weight of the resin solids (BORS) in the total formulation) and from about 100 wt. % to about 0 wt. % BORS of the high $T_g$ styrene-acrylic latex, wherein each of the styrene-acrylic latexes contain at least about 50 wt. % resin solids. In another non-limiting formulation, the aqueous coating composition contains from about 30 wt. % to about 70 wt. % low $T_g$ styrene-acrylic latex BORS and from about 70 wt. % to about 30 wt. % BORS of the high $T_g$ styrene-acrylic latex, wherein each of the styrene-acrylic latexes contain at least about 50 wt. % resin solids. Typically, the aqueous coating formulations are processed at temperatures between about 220° F. and 300° F.

In still another non-limiting formulation, the aqueous coating composition contains: A) about 20 to about 50 wt. % (based on the total weight of the solids in the coating composition or BOS) of one or more of the styrene-acrylic latex copolymer addition polymerization reaction products of
1) about 60 to about 90 wt. % (based on the total weight of the polymer or BOP) of at least one nonionic free radical polymerizable monomer,
2) up to about 5 wt. % BOP of at least one acidic free radical polymerizable monomer, and,
3) about 40 to about 10 wt. % BOP of at least one alkali-soluble stabilizing resin having an acid number of at least 150 mg KOH/g, wherein the reaction products have a glass transition temperature in a range from about −30° C. to about 60° C.;
B) about 80 to about 50 wt. % BOS of one or more of calcium stearate and zinc stearate;
C) up to about 5 wt. % BOS of silicone; and
D) the balance water.

In this formulation, the styrene-acrylic latex copolymers have a $T_g$ between about −40° C. 50° C.

In embodiments where the polymeric coating contains a styrene-acrylic latex copolymer, monomers which may be used include, but are not limited to, ethylenically unsaturated monomers such as olefins, monovinylaromatics, alpha, beta-ethylenically unsaturated carboxylic acids and esters thereof, ethylenically unsaturated dicarboxylic anhydrides (or acids) and esters thereof, and halo substituted olefinics. Specific examples of these monomers include, but are not limited to, styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, isobutyl methacrylate, itaconic acid, and combinations thereof. The alkali-soluble stabilizing resin may be a styrene/maleic anhydride copolymer.

Addition polymerization reactions are well known to those skilled in the art. The type of free-radical polymerization initiator suitable for use in the addition polymerization reaction to produce the styrene-acrylic latex copolymer is known in the art to depend upon the desired temperature for the reaction. Suitable initiators include, but are not limited to, t-butyl peroxide, t-butyl peroxybenzoate, t-butyl peroctoate, cumene hydroperoxide, azobisisobutyronitrile, benzoyl peroxide, ammonium persulfate, and combinations thereof.

The pH at which the styrene-acrylic latex copolymers are prepared may affect their stability. The pH range for use in the addition polymerization reaction is generally from about 7 to about 11. While PMP, PET, and PBT are generally applied by extrusion, the aqueous coating compositions are generally applied using blades, air knives, rod coaters, brushes, sprayer, and the like.

The polymeric coating may be applied to one or both sides of the paper substrate. For example, the polymeric coating can be applied to a paperboard substrate using coating weights in the range from about 0.1 to about 20 P/MSF. In another embodiment, the polymeric coating is applied to a paperboard substrate using coating weights in the range from about 1 to about 15 P/MSF. In yet another embodiment, the polymeric coating is applied to a paperboard substrate using coating weights in the range from about 2 to about 12 P/MSF.

Additives and adjuvants that can optionally be included in the polymeric coating include, but are not limited to, thickening agents, coalescent solvents (such as polyols), waxes, defoaming/dispersing agents, pigments, colorants, agents for improving the food release, grease barrier, water barrier, blocking resistance, crease-resistance, pH adjusters (such as aqueous ammonia), and/or agents for improving other properties of the ovenable corrugated paper container. In one embodiment, these additives and adjuvants, when used, are denoted GRAS for direct food contact under Food and Drug Administration guidelines.

Coalescent solvents, when used, can include, but are not limited to, a food grade polyol such as propylene glycol or glycerine, which facilitates lowering the minimum film forming temperature of the polymeric coating. When present, the coalescing solvent may be used in amounts up to about 20% by weight.

Thickeners and other rheology modifying agents, when used, can be added in amounts up to about 2 wt. %. Suitable thickeners include, but are not limited to, GRAS acrylic polymers, such as polyacrylic acid (such as Rohm & Haas Co. Acrysol ASE-60, an acrylic copolymer emulsion); clays, such as Bentonite; and/or cellulosics (carboxylmethylcellulose).

The defoaming/dispersing agent, when used, functions primarily to reduce the number of bubbles in the polymeric coating and are present up to about 1 wt. %. Examples of defoaming/dispersing agents include, but are not limited to, Colloid 963, a proprietary composition available from Rhone-Poulenc.

The polymeric coating may further contain up to about 15 wt. % of a food grade crosslinker, such as the melamine-formaldehyde resin Cymel 373 (available from Cytec Industries); and up to about 40 wt. % of a food grade wax, such as that from the carnauba wax emulsion Michemlube 160 (available from Michelman, Inc.) to improve the food release properties of the ovenable corrugated paper container; however, this is not required. Typically, the wax emulsion, when used, contains from about 15 wt. % to about 50 wt. % wax solids.

The outer liner 24 can include an optional coating on at least the side of the outer liner which can be used to smooth the surface and facilitates printing for a logo, instructions, and/or other decoration on the ovenable paper container 10. The cellulosic material or paper substrate for the outer liner 24 is generally of a weight/size sufficient to support printing and an optional coating to facilitate printing. The cellulosic material or paper substrate for the outer liner 24 is generally selected to have good resistance to conventional and/or microwave oven heating.

In one non-limiting arrangement, the outer liner 24 (with optional coating on the bottom or lower surface) has a weight of about 1-100 P/MSF. In another embodiment, the outer liner (with optional coating on the bottom or lower surface) has a weight of about 5-85 P/MSF. In yet another embodiment, the outer liner (with optional coating on the bottom or lower surface) has a weight of about 10-70 P/MSF.

The optional coating on the bottom or lower surface outer liner generally includes one or more additives that can include various pigments; however, this is not required. These pigments in the optional coating can be used to improve surface smoothness and/or uniformity; however, this is not required. These pigments can also contribute to increased brightness, opacity and gloss for appearance, and/or to reduced ink show-through; however, this is not required. Non-limiting examples of pigments that can be included in the optional coating include hydrous kaolin coating clays, fine calcined clay, trihydrated alumina, calcium carbonate, and/or titanium dioxide.

One or more adhesives can be optionally used to hold the optional coating on the lower or bottom surface of the outer liner to the paper substrate of the outer liner 24. Non-limiting examples of adhesive that can be used include starch, casein and/or lattices. Coating binders can be optionally included in the optional coating to positively affect gloss and ink holdout. The wet rub resistance of the optional coating on the lower or bottom surface of the outer liner can be improved by the use of selected adhesives such as, but not limited to, butadiene-styrene latex, butadiene-styrene, poly (vinyl acetate) (PVAc), and/or polyacrylic.

Dispersants can be optionally used on the optional coating on the lower or bottom surface of the outer liner to promote and/or maintain the separation of individual pigment particles in the optional coating. The dispersants can be used to reduce coating viscosities, enhance coating flow during the application process and/or contribute to an improved coating layer on the paper substrate. Non-limiting examples of dispersants include pentasodium tripolyphosphate, tetrasodium pyrophosphate, sodium tetraphosphate, casein, sodium silicate and/or sodium salts of carboxylic acids. Selection of a dispersant is largely determined by the type of pigments utilized in a specific optional coating on the lower or bottom surface of the outer liner.

The optional coating on the lower or bottom surface of the outer liner can include lubricants to improve coating flow properties, coating lay, surface finish and/or product printability. Such lubricants can reduce the tendency of the optional coating on the lower or bottom surface of the outer liner from cracking, and can be also or alternatively be used to prevent dusting. Non-limiting examples of lubricants include sodium stearate, calcium stearate, sulfonated oils, and/or polyethylene emulsions. Specific examples include a water-based lubricant under the trade designation PCL500 available from Michelman, Inc. These lubricants may be diluted with water prior to use; however, this is not required.

Insolubilizers, when used in the optional coating on the lower or bottom surface of the outer liner, can be used to improve water resistance of the coating. Insolubilizers are generally used to reduce the sensitivity of the adhesives to water and/or generally improve the wet rub resistance of the optional coating on the lower or bottom surface of the outer liner. Non-limiting examples of insolubilizers include urea resins, such as urea-formaldehyde, melamine resins, such as melamine-formaldehyde, and/or glyoxal.

Viscosity-reducing additives, when used, can be included in the optional coating on the lower or bottom surface of the outer liner can be used to control, lower and/or stabilize the viscosity of adhesives or pigments in the optional coating prior to application. Non-limiting examples of viscosity-reducing additives include urea, dicyandiamide, and/or ethylenediamine. The viscosity-reducing additives can be used to facilitate in maintaining uniform flow properties in the coating operation. Viscosity-increasing additives build viscosity into coatings where the primary binder is latex. Additives such as sodium carboxy methylcellulose, which is also an adhesive, can be used to increase viscosity of the top coating so as to improve runnability, coating lay, and/or uniformity of deposition of the optional coating on the outer liner. Other types of viscosity-reducing additives include sodium alginate (such as Kelgin) and/or hydroxy ethylcellulose (HEC).

The optional coating on the lower or bottom surface of the outer liner can be applied by blade coating, roll coating, brushing, spraying, etc. The optional coating formulations are generally designed, in part, to aid the blade-coating processes, when such a coating process is used. The blade generally removes excess optional coating that has been picked up in the applicator pan. Sulfated tall oil fatty acid can be used in the optional coating to promote coating leveling; however, this is not required.

The corrugated paper composite that is used to formed the ovenable paper container 10 can be prepared by a process known as the Stein-Hall process, although any suitable process may be employed. Corrugating machines are commercially available from the Bobst Group of companies. The Stein-Hall process employs a corrugating adhesive to bond a corrugated paper "medium," such as a roll or strip, to the outer liner 24 and/or inner liner 20. Adhesives that are used in conjunction with the Stein-Hall process are known, and such adhesives may contain one or more of an aqueous emulsion of raw starch, caustic, pasted modified or unmodified starch, and/or a cross-linking agent.

The paper substrate that is used to form the intermediate or corrugated layer has a weight of about 1-100 P/MSF. In another embodiment, the paper substrate used to form the intermediate or corrugated layer has a weight of about 5-85 P/MSF. In yet another embodiment, the paper substrate used to form the intermediate or corrugated layer has a weight of about 10-70 P/MSF. Typically, the paper substrate is a semi-chem medium paper; however, this is not required.

The flutes of the intermediate or corrugated layer may have any suitable size or shape. Non-limiting examples of shapes of flute and corresponding sizes including A—about 5 mm; B—about 3 mm; C—about 4 mm; E—about 1.5 mm; F flute—about 1.2 mm; N, G, and Z, etc.

The corrugated paper composite can be formed by laminating the intermediate or corrugated layer 22 to a) the inner liner 20 and outer liner simultaneously, b) the inner liner 20 then the outer liner 24, or c) the outer liner 24 then the inner liner 20. An adhesive may be employed on the outer curves of the intermediate or corrugated layer 22, and/or on the binding surface of the outer/inner liners 20, 22 so that the corrugated paper composite remains together.

A wide range of starch-based adhesive compositions and/or biodegradable adhesives can be used to adhesively connect together two or more layers of the corrugated paper composite. One non-limiting example of an adhesive that can be used is R130 adhesive by Fasson Inc. Another non-limiting example of an adhesive that can be used is a typical starch-based adhesive containing water, starch, caustic soda (to modify carrier texture and/or gel point), and borax (as a carrier extender). Starch-based adhesives can be of the carrier, no-carrier, and carrier-no-carrier type.

In carrier type starch-based adhesives, a portion of the starch forms a carrier, often known as the gelatinized phase, which suspends the balance of the starch which is in an ungelatinized state. Under conditions of heat and pressure, the ungelatinized starch is rapidly hydrated and gelatinized to rapidly increase the viscosity and adhesivity of the adhesive composition. In no-carrier type starch-based adhesives, substantially all of the starch is slightly cooked or swollen with heat and caustic soda for viscosity. Finally, carrier-no-carrier type starch-based adhesives have a portion of the starch which forms a carrier and is responsible for about one half of the viscosity and the remaining viscosity is obtained by slightly swelling the uncooked starch. Adhesives containing sodium silicates and clay may also be used.

In one non-limiting embodiment, a dry preblended carrier starch contains about 70%-90% by weight modified starch, which is typically in the form of oxidized starch, but may also or alternatively be in the form of dextrin, and about 10-30% by weight dry alkali in the form of sodium metasilicate and/or trisodium phosphate. The adhesive may also contain other components such as, but not limited to, fillers and bulking agents, and mineral oils to reduce dusting, etc.

Starches derived from the root, stem or fruit of a number of plants can be used. Examples of suitable starch sources include corn, wheat, potato, beet, tapioca, rice, sago and/or manioc. Other genetic forms of corn, such as high amylose and waxy corn as well as sorghum varieties can also or alternatively be used. This list is by no means complete and starches may be derived from any farinaceous material.

Suitable chemically modified starches may be employed as the adhesive. Chemically modified starches include, but not limited to, modified oxidized starch such as hypochloriteoxidized starch, acid-thinned starch, ethylated starch, cross-bonded starch, cationic starch, acetylated starch, starch monophosphates and others which have reduced molecular weight, higher fluidity and/or functional sub groups. Non-limiting examples of chemically modified starches are commercially available from Surebond, Inc. or under the trade designation STABLEBOND™ modified starches which have residual carboxyl functionality and extreme uniformity and are available from Corn Products International, Inc.

The corrugated paper composite typically has three layers as illustrated in FIG. 2, although additional layers may be added. The additional layers may be intermediate or corrugated layers and/or flat layers. Any suitable size of the sheets of corrugated paper composite may be formed as the size is not critical.

Once the corrugated paper composite is formed, it may be embossed 30 to provide indentations into the surface as illustrated in FIG. 3. Alternatively, the inner liner 20 may be embossed 30 prior to forming the corrugated paper composite. Still alternatively, die cut blanks (described below) may be embossed. Embossing may involve forming any suitable shape into the corrugated paper composite. Circles, squares, and rectangles are easily formed. The embossed shapes on the food surface of the ovenable corrugated paper container permits air to circulate underneath the food product held therein.

After the sheets of the corrugated paper composite are formed, the sheets are generally die-cut into blanks which are subsequently formed into a container shape as illustrated in FIG. 1. Die cutting methods are known. Flat bed or rotary dies may be employed. Scoring and cutting may be driven by a computer, contributing to uniform and consistent production. Any shape of blank may be formed, and typically depends upon the shape of the resultant ovenable paper container. For example, when forming an ovenable paper container having a pie crust shape, the shape of the blanks die cut is generally a circle. Oval, square, rectangular, triangular shapes are further examples of ovenable paper containers.

The blanks of corrugated paper composite are generally converted into ovenable corrugated paper containers 10 using a forming machine. The forming machine shapes or molds the blank into a container or pan shape under mechanical pressure and at least one of steam and heat for a sufficient period of time. The dwell time depends upon a number of factors, including the depth of the pan; the weights of the paper substrates employed for the inner, intermediate or corrugated, and outer layers; the temperature, and the like. Forming machines are available from a number of sources including Graylex and Peerless.

The blanks of corrugated paper composite may be shaped or molded into a container or pan shape by a thermoforming process. In such a process, the blanks of corrugated paper composite are subjected to a thermoforming mold. The blanks of corrugated paper composite may be placed between first and second dies having a mating protrusion and cavity in the desired shape. The dies compress the blanks of corrugated paper composite under heat and pressure sufficient to deform the blanks of corrugated paper composite into a shape congruent with the dies. Upon retraction of the dies, the corrugated paper composite retains the desired shape. The edges of the corrugated paper composite may be trimmed or otherwise finished for the use. The blanks of corrugated paper composite can be shaped or molded into the container or pan shape by the thermoforming process before or after the polymeric coating is applied to the inner liner.

Without the application of mechanical pressure and at least one of steam and heat (that is to say without thermoforming), the corrugated paper container may burn when exposed to elevated cooking temperatures. The application of mechanical pressure and at least one of steam and heat results in a corrugated paper container that can withstand oven cooking temperatures without burning, delaminating, and otherwise deforming.

The corrugated paper container or pan may have a one-piece seamless, unlapped structure. The corrugated paper container or pan needs no lapped joint to retain the desired shape because the container or pan is shaped or molded into the container or pan shape by the thermoforming process. Due to the seamless, unlapped construction of the corrugated paper container or pan, the container or pan may be leakproof or waterproof even when the container or pan is placed where the surrounding air is at elevated temperatures. Since the corrugated paper container is seamless, undesired wicking of liquid through a seam is avoided.

In one embodiment, the blanks of corrugated paper composite are converted into ovenable paper containers under a pressure of about 1,000 lbs. of force or more. In another embodiment, the blanks of corrugated paper composite are converted into ovenable paper containers under a pressure of about 10,000 lbs. of force or more. In yet another embodiment, the blanks of corrugated paper composite are converted into ovenable paper containers under a pressure of about 12,000 lbs. of force or more.

In one non-limiting arrangement, the blanks of corrugated paper composite are converted into ovenable paper containers under a pressure of up to about 25,000 lbs. of force. In another non-limiting arrangement, the blanks of corrugated paper composite are converted into ovenable paper containers under a pressure of up to about 20,000 lbs. of force. In yet another non-limiting arrangement, the blanks of corrugated paper composite are converted into ovenable paper containers under a pressure of up to about 18,000 lbs. of force.

These pressure parameters can be combined to provide a desired shape of the ovenable paper container, depending on, for example, the type of paperboard and adhesives, and the shape. For example, in one embodiment, the blanks of corrugated paper composite are converted into ovenable paper containers under a pressure of about 1,000-25,000 lbs. of force. In another embodiment, the blanks of corrugated paper composite are converted into ovenable paper containers under a pressure of about 10,000-20,000 lbs. of force. In yet another embodiment, the blanks of corrugated paper composite are converted into ovenable paper containers under a pressure of about 12,000-18,000 lbs. of force.

In one non-limiting arrangement, the blanks of corrugated paper composite are converted into ovenable paper containers at a temperature of about 30° C. or more. In another non-limiting arrangement, the blanks of corrugated paper composite are converted into ovenable corrugated paper containers at a temperature of about 50° C. or more. In yet another non-limiting arrangement, the blanks of corrugated paper composite are converted into ovenable corrugated paper containers at a temperature of about 75° C. or more.

In one non-limiting arrangement, the blanks of corrugated paper composite are converted into ovenable paper containers at a temperature of about 300° C. or less. In another non-limiting arrangement, the blanks of corrugated paper composite are converted into ovenable paper containers at a temperature of 250° C. or less. In yet another non-limiting arrangement, the blanks of corrugated paper composite are converted into ovenable paper containers at a temperature of about 200° C. or less.

These parameters can be combined to provide a desired shape of the ovenable paper container, depending on, for example, the type of paperboard and adhesives, and the shape. For example, in one embodiment, the blanks of corrugated paper composite are converted into ovenable paper containers at a temperature of about 30° C.-300° C. In another embodiment, the blanks of corrugated paper composite are converted into ovenable paper containers at a temperature of about 50° C.-250° C. In yet another embodiment, the blanks of corrugated paper composite are converted into ovenable paper containers at a temperature of about 75° C.-200° C.

In one non-limiting arrangement, the blanks of corrugated paper composite are converted into ovenable paper containers while about 0% or more steam is injected into the mold cavity. The % steam refers to the amount of water vapor in air that is injected into the mold cavity as it collapses upon the blank of corrugated paper composite. In another non-limiting arrangement, the blanks of corrugated paper composite are converted into ovenable paper containers while about 1% or more steam is injected into the mold cavity. In yet another non-limiting arrangement, the blanks of corrugated paper composite are converted into ovenable paper containers while about 2% or more steam is injected into the mold cavity.

In one non-limiting arrangement, the blanks of corrugated paper composite are converted into ovenable paper containers while about 50% or less steam is injected into the mold cavity. In another non-limiting arrangement, the blanks of corrugated paper composite are converted into ovenable paper containers while about 25% or less steam is injected into the mold cavity. In yet another non-limiting arrangement, the blanks of corrugated paper composite are converted into ovenable paper containers while about 10% or less steam is injected into the mold cavity.

These parameters can be combined to provide a desired shape of the ovenable paper container, depending on, for example, the type of paperboard and adhesives, and the shape. For example, in one non-limiting arrangement, the blanks of corrugated paper composite are converted into ovenable corrugated paper containers while about 0%-50% steam is injected into the mold cavity. In another non-limiting arrangement, the blanks of corrugated paper composite are converted into ovenable paper containers while about 1%-25% steam is injected into the mold cavity. In yet another non-limiting arrangement, the blanks of corrugated paper composite are converted into ovenable paper containers while about 2%-10% steam is injected into the mold cavity.

In one non-limiting arrangement, the blanks of corrugated paper composite are converted into ovenable paper containers using a dwell time of about 0.01 seconds or more. In another non-limiting arrangement, the blanks of corrugated paper composite are converted into ovenable paper containers using a dwell time of about 0.1 seconds or more. In yet another non-limiting arrangement, the blanks of corrugated paper composite are converted into ovenable paper containers using a dwell time of about 0.2 seconds or more.

In one non-limiting arrangement, the blanks of corrugated paper composite are converted into ovenable paper containers using a dwell time of about 60 seconds or less. In another non-limiting arrangement, the blanks of corrugated paper composite are converted into ovenable paper containers using a dwell time of about 30 seconds or less. In yet another non-limiting arrangement, the blanks of corrugated paper composite are converted into ovenable paper containers using a dwell time of about 10 seconds or less.

These parameters can be combined to provide a desired shape of the ovenable paper container, depending on, for example, the type of paperboard and adhesives, and the shape. For example, in one non-limiting arrangement, the blanks of corrugated paper composite are converted into ovenable paper containers using a dwell time of about 0.01-60 seconds. In another non-limiting arrangement, the blanks of corrugated paper composite are converted into ovenable paper containers using a dwell time of about 0.1-30 seconds. In yet another non-limiting arrangement, the blanks of corrugated paper composite are converted into ovenable paper containers using a dwell time of about 0.2-10 seconds.

The above-mentioned parameters can be combined to provide a desired shape of the ovenable paper container, depending on, for example, the type of paperboard and adhesives, and the shape. For example, in one non-limiting arrangement, the blanks of corrugated paper composite are converted into ovenable paper containers under a pressure of about 1,000-25,000 lbs. of force, at a temperature of about 30° C.-300° C., using a dwell time of about 0.01-60 seconds, while about 0%-50% steam is injected into the mold cavity. In another non-limiting arrangement, the blanks of corrugated paper composite are converted into ovenable paper containers under a pressure of about 10,000-20,000 lbs. of force, at a temperature of about 50° C.-250° C., using a dwell time of about 0.1-30 seconds while about 1%-25% steam is injected into the mold cavity. In yet another non-limiting arrangement, the blanks of corrugated paper composite are converted into ovenable paper containers under a pressure of about 12,000-18,000 lbs. of force, at a temperature of about 75° C.-200° C., using a dwell time of about 0.2-10 seconds, while about 2-10% steam is injected into the mold cavity.

Referring again to FIG. 1, an ovenable paper container 10 is shown with a food product 12 therein. The ovenable paper container 10 has a pie pan or circular pan shape, although any shape may be employed.

Referring now to FIG. 2, an exploded view of the ovenable paper container 10 is shown. The ovenable paper container 10 has a flat inner liner 20 made of a paper substrate and a polymeric coating, not shown, a intermediate or corrugated layer 22 made of corrugated paper, and a flat outer liner 24 made of a paper substrate and optional printable top coating. Adhesive may be present between the apexes of the arches of the intermediate or corrugated layer 22 and the inner liner 20 and/or the outer liner 24. Air occupies spaces 26, which may provide thermal insulation after a baking operation is completed. That is, a person may handle the ovenable paper container 10 soon after it is removed from an oven since the air spaces 26 keeps the surface temperature of the outer liner 24 far below the temperature of the food product 12 within the ovenable paper container 10.

Referring now to FIG. 3, an exploded view of the inner liner 20 of the ovenable paper container 10 is shown. The inner liner 20 has optional embossing 30 in the form of indentations. The embossing 30 facilitates the flow of hot air during baking.

The resultant ovenable paper container is suitable for either cooking or heating food products in an oven at elevated temperatures and for serving the cooked or heated food product without the danger of burning a person handling the container due to the insulation properties. The resultant ovenable paper container is suitable for not only holding hot food products where the surrounding air is at an ambient temperature but also cooking or heating food products where the surrounding air is heated at elevated temperatures. In accordance with the invention, burning, charring, delamination, melting, wicking, and other degrading events are inhibited or prevented even when the ovenable corrugated paper container is placed where the surrounding air is heated at elevated temperatures because the ovenable paper container has the thermoformed, seamless, unlapped, one-piece construction. The ovenable paper container may be leakproof or waterproof even when the food products with high water content is placed in the container and when the ovenable paper container is placed where the surrounding air is at elevated temperatures.

The ovenable paper container may be employed to cook or heat food items at the suitable elevated temperatures depending on, for example, the food product type or how the food is cooked or heated. The ovenable paper container may be employed to cook or heat food items at elevated temperatures of about 200° F. or more. In another non-limiting arrangement, the ovenable paper container may be employed to cook or heat food items at elevated temperatures of about 250° F. or more. In another non-limiting arrangement, the ovenable paper container may be employed to cook or heat food items at elevated temperatures of about 275° F. or more.

In one non-limiting arrangement, the ovenable paper container may be employed to cook or heat food items at elevated temperatures of about 600° F. or less. In another non-limiting arrangement, the ovenable paper container may be employed to cook or heat food items at elevated temperatures of about 550° F. or less. In another non-limiting arrangement, the ovenable paper container may be employed to cook or heat food items at elevated temperatures of about 500° F. or less.

These parameters can be combined to provide a desired cooked or heated food products, depending on, for example, the food product type or how the food is cooked or heated. For example, the ovenable paper container may be employed to cook or heat food items at elevated temperatures of about 200° F.-600° F. In another non-limiting arrangement, the ovenable paper container may be employed to cook or heat food items at elevated temperatures of about 250° F.-550° F. In another non-limiting arrangement, the ovenable paper container may be employed to cook or heat food items at elevated temperatures of about 275° F.-500° F. In another non-limiting arrangement, the ovenable paper container may be employed to cook or heat food items at elevated temperatures of about 260° F.-600° F. In another non-limiting arrangement, the ovenable paper container may be employed to cook or heat food items at elevated temperatures of about 280° F.-590° F. In another non-limiting arrangement, the ovenable paper container may be employed to cook or heat food items at elevated temperatures of about 300° F.-580° F. Notably, in one non-limiting arrangement, the ovenable non-limiting arrangement paper container may be employed to cook or heat food items at elevated temperatures of about 375° F. or more. In another non-limiting arrangement, the ovenable paper container may be employed to cook or heat food items at elevated temperatures of about 425° F. or more. In yet another non-limiting arrangement, the ovenable paper container may be employed to cook or heat food items at elevated temperatures of about 450° F. or more.

The ovenable paper container may be employed to cook or heat food items at the elevated temperatures for suitable time period depending on the food product type or how the food is cooked or heated. The ovenable paper container may be employed to cook or heat food items at the elevated temperatures for about 3 minutes or more. In another non-limiting arrangement, the ovenable paper container may be employed to cook or heat food items at the elevated temperatures for about 5 minutes or more. In another non-limiting arrangement, the ovenable paper container may be employed to cook or heat food items at the elevated temperatures for about 10 minutes or more.

The ovenable paper container may be employed to cook or heat food items at the elevated temperatures for about 3 hours or less. In another non-limiting arrangement, the ovenable non-limiting arrangement paper container may be employed to cook or heat food items at the elevated temperatures for about 2 hours or less. In another non-limiting arrangement, the ovenable paper container may be employed to cook or heat food items at the elevated temperatures for about 1 hour or less.

These parameters can be combined to provide a desired cooked or heated food products, depending on, for example, the food product type or how the food is cooked or heated. For example, the ovenable paper container may be employed to cook or heat food items at the elevated temperatures for about 3 minutes to about 3 hours. In another non-limiting arrangement, the ovenable paper container may be employed to cook or heat food items at the elevated temperatures for about 5 minutes to about 2 hours. In another corrugated, the ovenable paper container may be employed to cook or heat food items at the elevated temperatures for about 10 minutes to about 1 hour.

The above-mentioned parameters can be combined to provide a desired cooked or heated food products, depending on, for example, the food product type or how the food is cooked or heated. For example, the ovenable paper container may be employed to cook or heat food items at elevated temperatures of about 200° F.-600° F. for about 3 minutes to about 3 hours. In another corrugated, the ovenable paper container may be employed to cook or heat food items at elevated temperatures of about 250° F.-550° F. for about 5 minutes to about 2 hours. In another corrugated, the ovenable paper container may be employed to cook or heat food items at elevated temperatures of about 275° F.-500° F. for about 10 minutes to about 1 hour.

The ovenable paper container is suitable for use in any oven. Examples of ovens include, but are not limited to, conventional ovens, convection ovens, microwave ovens, hybrid convection-microwave ovens, conventional-microwave ovens, toaster ovens, stone ovens, clay ovens, and the like.

The food products that may be cooked or heated in the ovenable paper container are those that conventionally cooked in an oven. Examples of food products include, but not limited to, breads, fish, meats, pastas, pizza, vegetables, sandwiches, hot pockets, calzones, pies, cakes, brownies, cookies, pastries, and the like.

When cooking a dough containing food product in the ovenable paper container, it may be beneficial to include a dough additive or to sprinkle a moisture absorbent in the ovenable paper container (before placing the dough containing food product into the container) to facilitate formation a crisp dough; however, this is not required. Dough containing food products include, but are not limited to, breads, pizza, hot pockets, calzones, pastries, pies, cakes, brownies, and cookies. Non-limiting examples of dough additive and moisture absorbents include, but are not limited to, corn meal, a product under the trade designation Pizza Crisp™ available from Pizza Crisp International, Ltd., and/or a product under the trade designation Krisp-It available from Krisp-It, Ltd.

A lid, not shown, may be constructed of the ovenable paper container 10. Optionally, a lid may have the same construction except that the inner liner of the lid does not require the polymeric coating and/or may be constructed of a lower weight paper substrate, similar to those of the intermediate or corrugated liner 22 and the outer liner 24. The lid may be optionally shaped to detachably fit over the ovenable paper container 10. The lid may optionally have holes positioned therein, or the lid may be optionally scored so that a subsequent user may open ventilation holes.

It is to be understood that any numerical figure of a given parameter may be combined with a different numerical figure of the same parameter to form a range for the given parameter.

Figure 4:
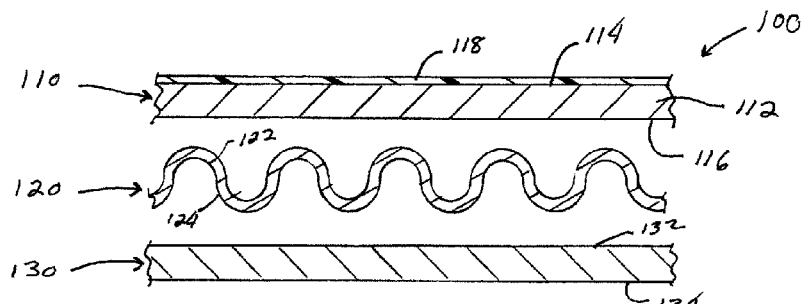
FIG. 4 is a cross-sectional side view of a portion of another ovenable paper container in accordance with the present invention.
Figure 5:
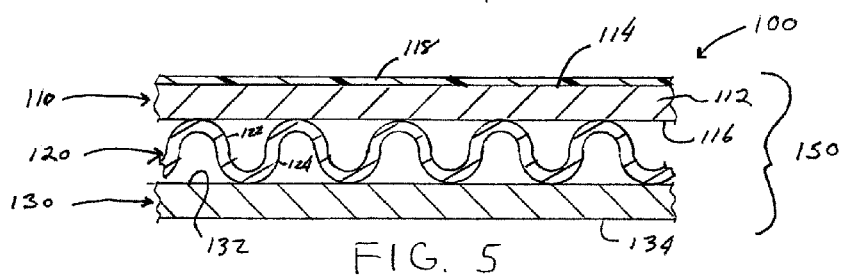
FIG. 5 is a cross-sectional side view of the ovenable paper container of FIG. 4 wherein the container layers are stacked on one another prior to a forming process.

Referring now to FIGS. 4-13 there is illustrated an ovenable paper container 100 and a device for forming the ovenable paper container in accordance with the present invention. As illustrated in FIGS. 4 and 5, the ovenable paper container 100 is formed of three components, namely an outer liner 110, an intermediate or corrugated layer 120, and an outer liner 130.

The inner liner 110 is formed of a paper substrate 112 and a polymeric coating 118 positioned on the upper surface 114 of the paper substrate. The polymeric coating 118 can be formed of one or more layers of polymeric material. The paper substrate 112 can be formed of one or more layers of paper material. Generally the paper substrate is formed of a cellulosic material. The polymeric coating 118 can be formed of one or more polymers (e.g., PET, PBT, PMP, etc.). As illustrated in FIGS. 4 and 5, the inner liner is formed of a single layer of paper substrate 112. The paper substrate used to form the inner liner is generally not a corrugated layer. The thickness of the paper substrate is generally thicker than the polymeric coating. The thickness ratio of the paper substrate to the polymeric coating is generally about 1.01-1000:1, typically about 1.5-500:1, and more typically about 2:100:1. The paper substrate 112 generally has a weight of about 10-250 pounds per thousand square feet (P/MSF), and typically about 35-125 P/MSF. The polymeric coating 118 generally has coating weight of about 0.1-30 P/MSF, and typically about 1-15 P/MSF. The polymeric coating is generally coated on the paper substrate prior to the inner liner being subjected to a forming process that forms the paper container 100 into it final shape. The polymeric coating can be applied to the upper surface of the paper substrate 112 by a variety of application processes (e.g., extrusion, spray coating, etc.). Generally, only the upper surface of the paper surface includes a polymeric coating. The polymeric coating is generally used to inhibit or prevent food from sticking to the inner liner during the heating or cooking of the food in the paper container. As can be appreciated, the polymeric coating can have other or additional functions. The upper surface 114 of the paper substrate 112 generally is formed of a single layer of cellulosic material, thus is absent a seam.

The intermediate or corrugated layer 120 is generally formed of a cellulosic material. The intermediate or corrugated layer 120 can be formed of one or more layers of cellulosic material. As illustrated in FIGS. 4 and 5, the intermediate or corrugated layer 120 is formed of a single layer of fluted cellulosic material. The single layer of fluted cellulosic material has an upper surface 122 and a lower surface 124. The intermediate or corrugated layer 120 generally has a weight of about 10-85 P/MSF, and typically about 12-65 P/MSF. The intermediate or corrugated layer 120 can have any suitable shape and size of flutes. The average height of the flutes prior to the forming of the paper container 100 is generally at least about 0.5 mm, typically no more than about 20 mm, more typically about 1-8 mm, and even more typically about 1.2-6 mm. Generally the paper weight of the intermediate or corrugated layer 120 is less than the paper weight of the paper substrate 112 of the inner liner 110.

The outer liner 130 is generally formed of a cellulosic material. The outer liner 130 can be formed of one or more layers of cellulosic material. As illustrated in FIGS. 4 and 5, the outer liner is formed of a single layer of cellulosic material. The single layer of cellulosic material has an upper surface 132 and a lower surface 134. The paper substrate used to form the outer liner is generally not a corrugated layer. The outer liner 130 generally has a weight of about 10-80 P/MSF, and typically about 12-60 P/MSF. The outer liner can optionally include a coating on the lower surface, not shown, that can be used to facilitate in the application of printed material on the lower surface. The thickness ratio of the paper substrate of the outer liner to the coating on the lower surface of the paper substrate, when such coating is used, is generally about 1.01-1000:1, typically about 1.5-500:1, and more typically about 2:100:1. The optional coating can be applied to the lower surface of the paper substrate of the outer liner by a variety of application processes (e.g., extrusion, spray coating, etc.).

As illustrated in FIG. 5, the three layers of the paper container are placed together to form a cardboard composite 150 prior to the forming of the paper container into it final form. One or more of the three layers of the cardboard composite 150 can be connected together prior to the final forming of the paper container; however, this is not required. When one or more layers of the cardboard composite 150 are connected together prior to the final forming of the paper container, such layers are generally connected together by an adhesive; however, other or additional materials (e.g., polymeric materials, mechanical connectors, etc.) can be used.

Figure 6:
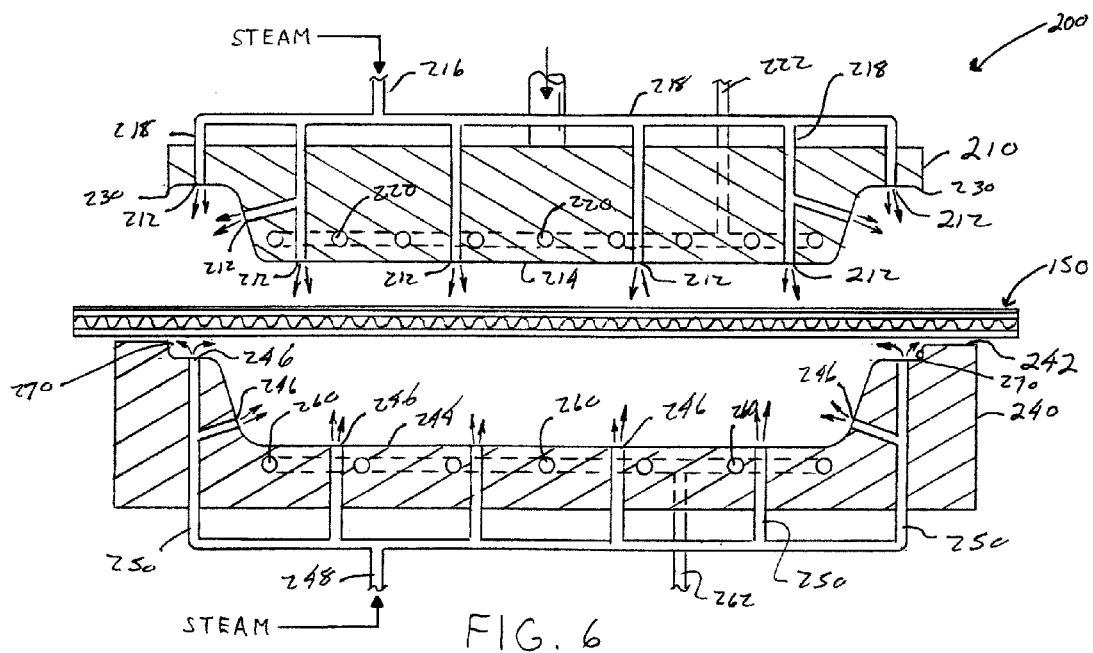
FIG. 6 is a cross-section view of one non-limiting steam and heat forming apparatus that can be used to form the ovenable paper container of FIGS. 2-5.
Figure 7:
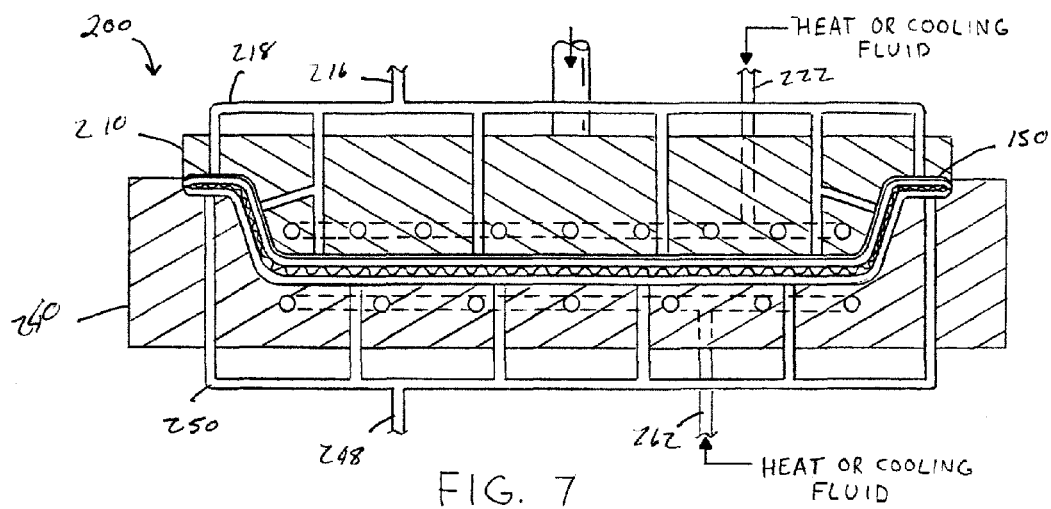
FIG. 7 is a cross-sectional view of the steam and heat forming apparatus of FIG. 6 and illustrates the forming of the ovenable paper container by the apparatus.

Referring now to FIGS. 6 and 7, there is illustrated a non-limiting thermoforming apparatus 200 that can be used to form the cardboard composite 150 into paper container 10, 100. The thermoforming apparatus includes an upper die 210 and a lower die 240. As illustrated in FIG. 6, the cardboard composite is placed on the upper ledge 242 of the lower die prior to forming the cardboard composite. The cardboard composite is generally cut prior to being placed on the lower die; however, this is not required. Once the cardboard composite is properly positioned on the lower die, the upper and lower die are brought together to formed the cardboard composite into a paper container as illustrated in FIG. 7. FIGS. 6 and 7 illustrate that the upper die 210 is lowered into the lower die as shown by the arrow; however, it can be appreciated that the lower die can also or alternatively be lifted toward the upper die during the forming of the paper container; however, this is not required.

As illustrated by FIGS. 6 and 7, the upper die is shown to include a plurality of steam openings 212 on the lower surface 214 of the upper die. The steam openings are illustrated as being positioned throughout the lower surface of the upper die; however, this is not required. As can be appreciated, the upper die can include only a single opening. The steam is shown to be directed into a steam source tube 216 that is connected to a plurality of steam tubes 218 which direct the steam to the plurality of steam openings 212. The upper die is also illustrated as including an internal heating source. The internal heating source is generally in the form of a heat coil 220 that is connected to a power cable 222, which in turn is connected to a power source. The heating coils are illustrated as being positioned nearer to the lower surface of the upper die; however, this is not required. The internal hating source can be designed to uniformly or non-uniformly heat the lower surface 214 of the upper die. As can be appreciated, the internal heating source can also or alternatively be a heating system based on the flow of heated or cooled fluid (e.g., heated/cooled liquid, heated/cooled gas, etc.) through one or more passageways in the upper die as illustrated in FIG. 7. As can be appreciated, the upper die can be designed to only include a steam source, only include an internal heating, or be absent both a steam source and internal heating source.

As also illustrated by FIGS. 6 and 7, the lower die 240 is shown to include a plurality of steam openings 246 on the upper cavity surface 244 of the lower die. The steam openings are illustrated as being positioned throughout the upper cavity surface of the lower die; however, this is not required. As can be appreciated, the lower die can include only a single steam opening 246. The steam is shown to be directed into a steam source tube 248 that is connected to a plurality of steam tubes 250 which direct the steam to the plurality of steam openings 246. The lower die is also illustrated as including an internal heating source. The internal heating source is generally in the form of a heat coil 260 that is connected to a power cable 262, which in turn is connected to a power source, not shown. The heating coils are illustrated as being positioned nearer to the upper cavity surface 244 of the lower die; however, this is not required. The internal hating source can be designed to uniformly or non-uniformly heat the upper cavity surface 244 of the lower die. As can be appreciated, the internal heating source can also or alternatively be a heating system based on the flow of heated or cooled fluid (e.g., heated/cooled liquid, heated/cooled gas, etc.) through one or more passageways in the lower die as illustrated in FIG. 7. As can be appreciated, the lower die can be designed to only include a steam source, only include an internal heating, or be absent both a steam source and internal heating source.

As illustrated in FIG. 7, when the upper and lower dies are moved together, the cardboard composite is bent and formed into a paper container 10, 100. During the thermoforming process, steam and/or heat from the internal heating source from the upper and/or lower die is applied to the cardboard composite. The amount of steam, the temperature the cardboard composited is heated to, and the dwell time of the cardboard composite between the upper and lower dies can be selected to form the desired paper container.

Figure 8:
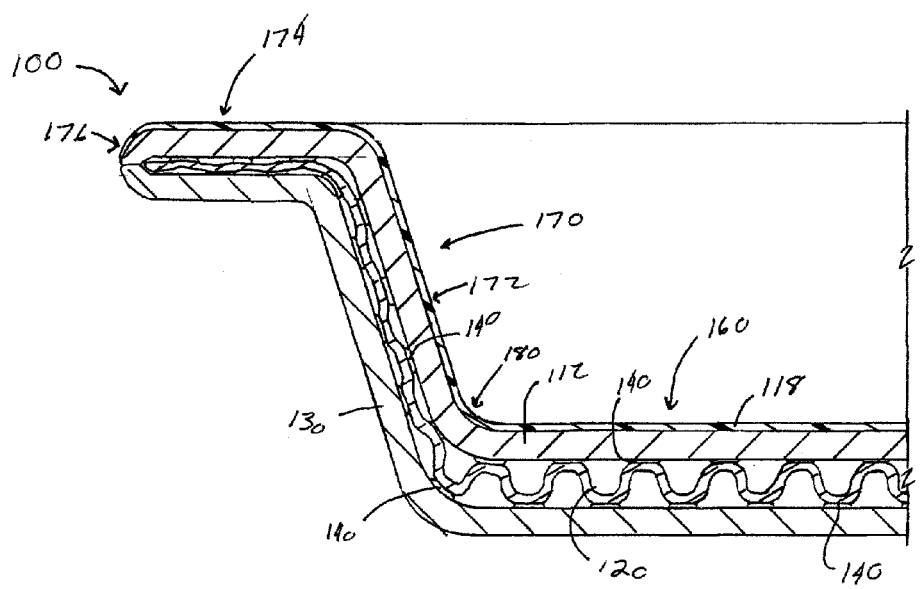
FIG. 8 is a cross-sectional side view of a portion of the ovenable paper container and illustrates the compression and bonding of the layers of the ovenable paper container from the forming process.

FIG. 8 illustrates a cross-section of a portion of the paper container 100 that can be formed from thermoforming apparatus 200. As illustrated in FIG. 8, the formed paper container 100 includes a generally flat upper surface 160 of the base region of the paper container. The upper flat surface is formed by the paper substrate 112 and polymeric coating 118 of the inner liner. The formed paper container also includes a rim 170 that extends upwardly from upper surface 160. The rim 170 includes an interior or inner surface 172 that is formed by the paper substrate 112 and polymeric coating 118 of the inner liner. A curved transition region 180 exists between rim 170 and the generally flat upper surface 160. FIG. 8 illustrated that there is no seam between the generally flat upper surface 160 and rim 170. Generally, the complete inner surface of the paper container, including the rim, is absent a seam. Rim 170 is illustrated as having a rolled or bent edge 174; however, this is an optional feature of the formed paper container. The upper portion of end 176 of rolled or bent edge 174 is illustrated as being compressed downwardly; however, this is not required. The compression of the upper portion of end 176 can be accomplished by an end edge 230 on the upper die; however, it can be appreciated that other or alternative arrangements can be used to compress end 176. As is also illustrated in FIG. 8, the lower portion of end 176 of rolled or bent edge 174 is illustrated as being compressed upwardly; however, this is not required. The compression of the lower portion of end 176 can be accomplished by a curved edge portion 270 on the lower die; however, it can be appreciated that other or alternative arrangements can be used to compress end 176.

As illustrated in FIG. 8, the inner liner and outer liner of the paper container are formed during the forming process; however, these two layers are primarily bent, but generally not further compressed, during the forming process. As such, there is little, if any, thickness changes in the inner liner and the outer liner before or after the forming process. Generally the thickness change of the inner and outer liners due to the forming process is less than about 20%, typically less than about 10%, and more typically less than about 5%. Although the thickness of the inner and outer liner change little, if any, during the forming process, the intermediate or corrugated layer has a substantial change in thickness in the transition region and the rim of the paper container as illustrated in FIG. 8. The paper container of the present invention is formed so that the intermediate or corrugated layer 120 is partially or fully crushed in the rim and transition region of the paper container. It has been found that compressing the intermediate or corrugated layer in the rim and transition region of the paper container facilitates in maintaining the shape and integrity of the paper container after the forming process and during the heating or cooking of food in the paper container. During the forming process, over 75 percent of the flutes of the intermediate or corrugated layer 120 that are located in the rim are crushed to less than about 30 percent of the originally height of the flutes. Also, during the forming process, over 50 percent of the flutes of the intermediate or corrugated layer 120 that are located in the transition region are crushed to less than about 70 percent of the originally height of the flutes. The formed paper container is also designed to preserve the flutes in the intermediate or corrugated layer 120 that are located beneath the generally flat upper surface 160 of the paper container. The preservation of the flutes in this region of the paper container results in increased spacing between the inner and outer liner. Such increased spacing creates the desired insulating properties of the paper container that allow a person the touch the bottom of the paper container without concern of being burned immediately or shortly after a food has been heated or cooked in the paper container. Generally the majority of the flutes of the intermediate or corrugated layer 120 that are located beneath the generally flat upper surface 160 of the paper container are crushed less than the flutes located in the transition region and rim, and generally over 80 percent of the flutes located beneath the generally flat upper surface 160 of the paper container are crushed to no more that than about 30 percent of the originally height of the flutes, typically no more that than about 40 percent of the originally height of the flutes, more typically no more that than about 50 percent of the originally height of the flutes.

Referring again to FIG. 8, the three layers of the paper container are shown to be connected together at discrete points on the fluted regions of the intermediate or corrugated layer 120 by an adhesive 140. The adhesive is typically a natural starch and/or synthetic starch adhesive; however, other or additional adhesives can be used. During the forming process of the paper container, the adhesive is generally heated and softened so that the adhesive can properly bond to the formed portions of the paper container. The adhesive can be a pre-applied adhesive that is located on one or more surfaces of the paper container layers. In one non-limiting configuration, the intermediate or corrugated layer 120 includes starch and/or is coated with starch prior to the forming process, and such starch on and/or contained in the intermediate or corrugated layer 120 forms a bond with the inner and outer liners prior to, during and/or after the forming process. In one particular non-limiting aspect of this configuration, the starch is the only adhesive used in the paper container to bond the intermediate or corrugated layer 120 to the inner and outer liners in the region below the generally flat upper surface 160. In another particular non-limiting aspect of this configuration, the starch is the only adhesive used in the paper container to bond the intermediate or corrugated layer 120 to the inner and outer liners in the transition region 180. In still another particular non-limiting aspect of this configuration, the starch is the only adhesive used in the paper container to bond the intermediate or corrugated layer 120 to the inner and outer liners in the rim.

As illustrated in FIG. 8, the inner surface 172 of rim 170 is generally flat; however, this is not required. The angle between the inner surface 172 of rim 170, not including rolled or bent edge 174, and the upper surface 160 is generally about 30-90°. The end 176 of the bent or rolled edge 174 is generally formed of the outer and inner liners being compressed together. Generally an adhesive is used to secure the outer and inner liners together end 176. In one non-limiting configuration, the adhesive from the intermediate or corrugated layer 120 located at or near end 176 is the primary adhesive source used to secure together the ends of the inner and outer liners.

Figure 9:
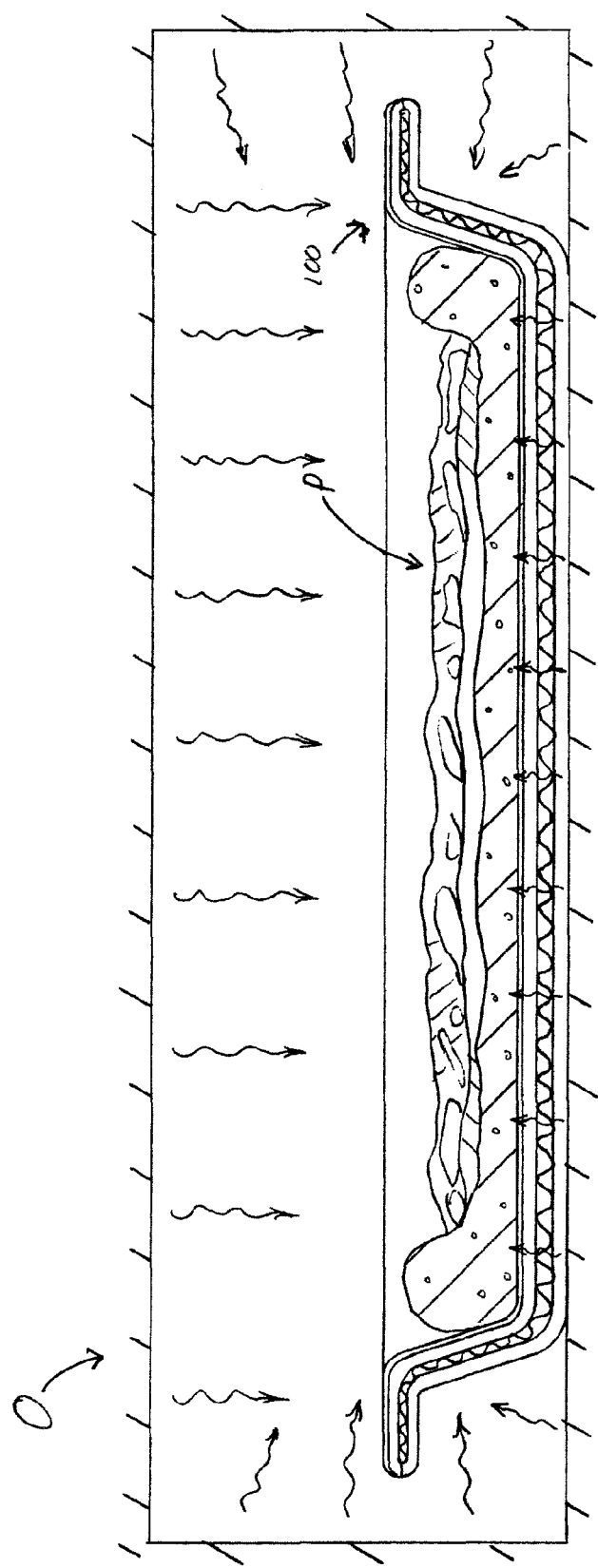
FIG. 9, is a cross-sectional side view of the ovenable paper container of FIGS. 4-5 and illustrates a pizza in the ovenable paper container being heated or cooked in an oven.

Referring now to FIG. 9, there is illustrated a formed paper container 100 that contains a food product such a pizza P on the upper surface 160 of the paper container. The paper container and food product are shown to be located in an oven O. Heat from the oven that is represented by the arrows heats and/or cooks the food product contained in the paper container. During the heating or cooking process, the paper container resists burning, charring and/or delamination of one or more of the layers of the paper container.

Figure 10:
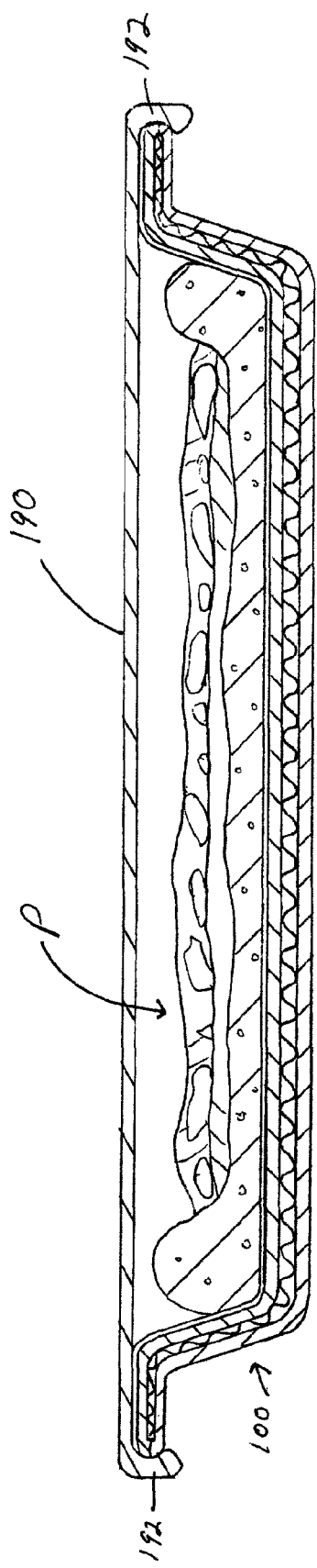
FIG. 10 is a cross-sectional side view of the ovenable paper container of FIGS. 4-5 and illustrates a removable top or cover placed on the ovenable paper container.

Referring now to FIG. 10, a lid or cover 190 can be attached to the top of the paper container. The use of a lid or cover is optional. As illustrated in FIG. 10, the lid 190 includes curved end edges 192 that are designed to releasably secure to end 176 of the bent or rolled edge 174 of the paper container. Generally the lid is formed of a cellulosic material; however, other or additional materials can be used (e.g., plastic, metal, etc.). As also can be appreciated, the lid, when used, can be connected to the paper container by other or additional arrangements (adhesive, melted bond, staple, slot connection, etc.). The lid can include one or more openings to allow moisture to escape the when the lid is placed on the paper container; however, this is not required. The lid can be a thermoformed component; however, this is not required.

Figure 11:
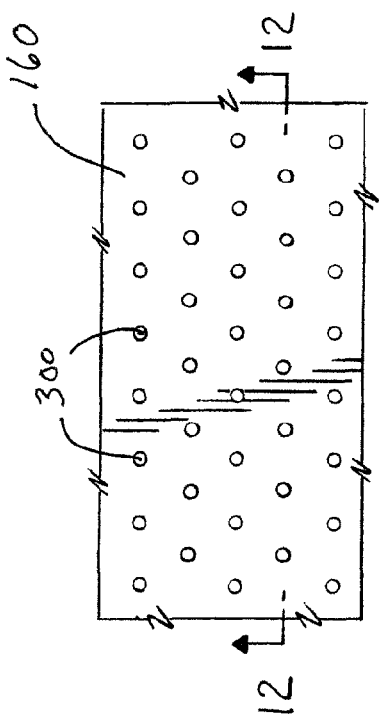
FIG. 11 is a top view of a portion of an ovenable paper container in accordance with the present invention and illustrates a plurality of openings in the top surface of the ovenable paper container.
Figure 12:
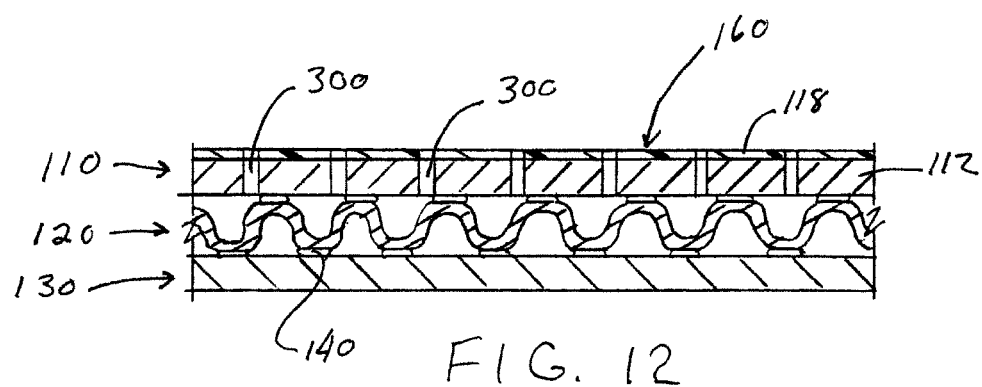
FIG. 12 is a cross-sectional view along lines 12-12 of FIG. 11.

Referring now to FIGS. 11 and 12, the upper surface 160 of the paper container can include one or more openings 300 that penetrate through the inner layer 110. The one or more openings are designed to allow liquid on the upper surface 160 to flow through the openings be retained between the inner and outer liners. When there is too much liquid on the upper surface 160, such liquid can interfered with the browning of dough products. The one or more openings in the inner liner are designed to remove some or all of the liquid on the upper surface and thereby improve the heating and/or cooking of food in the container. The inclusion of the one or more openings 300 is optional since some types of food products may not benefit from such openings (e.g., soup, casseroles, etc.). When the upper surface includes a plurality of openings 300, such openings can be uniformly or non-uniformly positioned in the upper surface of the paper container. One or more openings can be included on the inner surface 172 of rim 170; however, this is not required. One or more openings can be included on the upper surface of the transition region 180; however, this is not required. The average cross-sectional area of the openings is about 0.002-0.06 in$^2$ and the average spacing of the openings from one another is at least about 0.03 inches. As best illustrated in FIG. 12, openings 300 fully penetrate through inner liner 110, but do not fully penetrate though outer liner 130. As such, liquid that passes though inner liner 110 through openings 300 is partially retained or trapped between the inner and outer liners. As a result, essentially all of the liquid that passes through openings 300 does not accumulate on or dip from the bottom or lower surface 134 of outer liner 130. One or more of the openings may partially or fully pass through intermediate or corrugated layer 120; however, this is not required. One or more of the openings may partially pass through outer liner 130; however, this is not required. The formation of one or more of openings 300 can occur before, during and/or after the forming of the corrugated composite into the formed paper container. As such, the inner liner can be preformed with one or more openings, the upper die can form one or more openings during the forming process, and/or after the paper container is formed, the upper surface can be treated to form one or more openings in the upper surface of the formed paper container.

Figure 13:
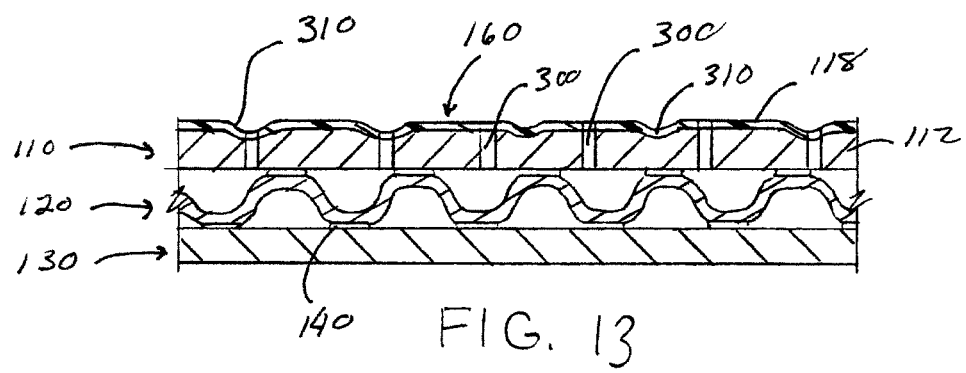
FIG. 13 is a cross-section side view of an ovenable paper container and illustrates an embossed top surface of the ovenable paper container.

Referring now to FIG. 13, the upper surface 160 of the paper container can include embossing 310. Embossing the upper surface of the paper container can be used to increase the integrity of the paper container and/or improve the cooking of food in the paper container. The inclusion of embossing on the upper surface of the paper container is optional. When the upper surface includes embossing, the embossing can be uniformly or non-uniformly positioned in the upper surface of the paper container. The embossing can be included on the inner surface 172 of rim 170; however, this is not required. The embossing can be included on the upper surface of the transition region 180; however, this is not required. The embossing can be used in paper containers that contain or do not contain openings 300. When the paper container includes openings 300, the embossing can facilitate in directing liquid into the openings; however, this is not required. The formation of embossing 310 can occur before, during and/or after the forming of the corrugated composite into the formed paper container. As such, the inner liner can be preformed with embossing, the upper die can form the embossing during the forming process, and/or after the paper container is formed, the upper surface can be treated to form embossing in the upper surface of the formed paper container.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

Example 1

A corrugated paper composite is provided with a flat inner liner made of a 60 P/MSF paper substrate and a PET coating, an intermediate or corrugated layer made of 20 P/MSF corrugated paper, and a flat outer liner made of a 26 P/MSF paper substrate and top coating of a PCL500 water based lubricant available from Michelman, Inc. A starch adhesive is used between the apexes of the arches of the intermediate or corrugated layer and the inner liner and the outer liner.

The corrugated paper composite is die cut into circles. The circular corrugated paper composites are converted into ovenable paper containers under 14,000 lbs. force, and at about 150° C. with a dwell time of about 0.5 seconds using a forming machine. The ovenable paper container optionally includes a plurality of openings in the inner liner and/or embossing of the upper surface of the inner liner.

Example 2

A corrugated paper composite is provided with a flat inner liner made of a 69 P/MSF paper substrate and a PMP coating, an intermediate or corrugated layer made of 26 P/MSF corrugated paper, and a flat outer liner made of a 20 P/MSF paper substrate and top coating of a PCL500 water based lubricant available from Michelman, Inc. A starch adhesive is used between the apexes of the arches of the intermediate or corrugated layer and the inner liner and the outer liner.

The corrugated paper composite is die cut into circles. The circular corrugated paper composites are converted into ovenable paper containers under 16,000 lbs. force, and at about 175° C. with a dwell time of about 0.5 seconds using a forming machine. The ovenable paper container optionally includes a plurality of openings in the inner liner and/or embossing of the upper surface of the inner liner.

Example 3

A corrugated paper composite is provided with a flat inner liner made of a 99 P/MSF paper substrate and an aqueous coating, an intermediate or corrugated layer made of 7 P/MSF corrugated paper, and a flat outer liner made of a 69 P/MSF paper substrate and top coating of a sulfated tall oil fatty acid. A starch adhesive is used between the apexes of the arches of the intermediate or corrugated layer and the inner liner and the outer liner. The aqueous coating contains styrene-acrylic latex copolymer (styrene:maleic anhydride copolymer, methylmethacrylate, and ethylhexacrylate), calcium stearate, silicone (Silicone 175 from Dow Corning), and water.

The corrugated paper composite is die cut into circles. The circular corrugated paper composites are converted into ovenable paper containers under 18,000 lbs. force, and at about 1700 with a dwell time of about 0.5 seconds using a forming machine. The ovenable paper container optionally includes a plurality of openings in the inner liner and/or embossing of the upper surface of the inner liner.

Example 4

A corrugated paper composite is provided with a flat inner liner made of a 60 P/MSF paper substrate and a PET coating, an intermediate or corrugated layer made of 20 P/MSF corrugated paper, and a flat outer liner made of a 26 P/MSF paper substrate and top coating of a PCL500 water based lubricant available from Michelman, Inc. A starch adhesive is used between the apexes of the arches of the intermediate or corrugated layer and the inner liner and the outer liner.

The corrugated paper composite is die cut into circles. The circular corrugated paper composites are converted into ovenable paper containers under 13,000 lbs. force, 4% injected steam, and at about 160° C. with a dwell time of about 0.25 seconds using a forming machine. The ovenable paper container optionally includes a plurality of openings in the inner liner and/or embossing of the upper surface of the inner liner.

Example 5

A corrugated paper composite is provided with a flat inner liner made of a 69 P/MSF paper substrate and a PMP coating, an intermediate or corrugated layer made of 26 P/MSF corrugated paper, and a flat outer liner made of a 20 P/MSF paper substrate and top coating of a PCL500 water based lubricant available from Michelman, Inc. A starch adhesive is used between the apexes of the arches of the intermediate or corrugated layer and the inner liner and the outer liner.

The corrugated paper composite is die cut into circles. The circular corrugated paper composites are converted into ovenable paper containers under 16,000 lbs. force, 7% injected steam, and at about 175° C. with a dwell time of about 0.5 seconds using a forming machine. The ovenable paper container optionally includes a plurality of openings in the inner liner and/or embossing of the upper surface of the inner liner.

Example 6

A corrugated paper composite is provided with a flat inner liner made of a 99 P/MSF paper substrate and an aqueous coating, an intermediate or corrugated layer made of 7 P/MSF corrugated paper, and a flat outer liner made of a 69 P/MSF paper substrate and top coating of a sulfated tall oil fatty acid. A starch adhesive is used between the apexes of the arches of the intermediate or corrugated layer and the inner liner and the outer liner. The aqueous coating contains styrene-acrylic latex copolymer (styrene:maleic anhydride copolymer, methylmethacrylate, and ethylhexacrylate), calcium stearate, silicone (Silicone 175 from Dow Corning), and water.

The corrugated paper composite is die cut into circles. The circular corrugated paper composites are converted into ovenable paper containers under 17,000 lbs. force, 9% injected steam, and at about 180° C. with a dwell time of about 0.75 seconds using a forming machine. The ovenable paper container optionally includes a plurality of openings in the inner liner and/or embossing of the upper surface of the inner liner.

Example 7

A corrugated paper composite is provided with a flat inner liner made of a 64 P/MSF paper substrate and a PVC, PET, PBT and/or PMP coating, an intermediate or corrugated layer made of 20 P/MSF corrugated paper, and a flat outer liner made of a 26 P/MSF paper substrate and an optional coating. A starch adhesive is included in and/or applied to the intermediate or corrugated layer so as to form a bond between the intermediate or corrugated layer and the inner liner and the outer liner after the forming process.

The corrugated paper composite is die cut into circles. The circular corrugated paper composites are converted into ovenable paper containers under 12,000-18,000 lbs. force, and at about 150°-180 C with a dwell time of about 0.25-2 seconds using a forming machine. Steam and/or heat may be used during the forming process. The ovenable paper container optionally includes a plurality of openings in the inner liner and/or embossing of the upper surface of the inner liner.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A container designed for use with food products and which can be exposed to temperatures of at least about 200° F., container, said container having a base and a container rim that at least partially encircles said base, said container comprising an inner liner, an outer liner and a corrugated layer positioned between said inner and outer liners; said corrugated layer is formed of a plurality of flutes, said corrugated layer having a corrugated base portion, a corrugated rim portion and a corrugated transition region; said outer liner having an upper and a lower surface, said outer liner having a weight of at least about 10 pounds per thousand square feet, said lower surface of said outer liner forming a bottom surface of said container, said outer liner having an outer base portion, an outer rim portion and an outer transition region; said inner liner having an upper and a lower surface, said inner liner having a weight of at least about 20 pounds per thousand square feet, said inner liner is formed of an inner base portion, an inner transition region and an inner rim portion; said inner transition region of said inner liner is positioned between said inner base portion and said inner rim portion; said outer transition region of said outer liner is positioned between said base portion and said rim; said corrugated transition region of said corrugated layer is positioned between said corrugated base portion and said corrugated rim portion; said inner rim portion of said inner liner is at least partially encircling said inner base portion; said outer rim portion of said outer liner is at least partially encircling said outer base portion; said corrugated rim portion of said corrugated layer is at least partially encircling said corrugated base portion; said inner base portion of said inner liner is generally planar; said inner rim portion of said inner liner extending above said inner base portion of said inner liner; an upper surface of said inner rim portion, an upper surface of said inner base portion and an upper surface of said inner transition region of said inner liner forming said upper surface of said inner liner, said upper surface of said inner liner is absent a seam; a majority of said upper surface of said inner rim portion of said inner liner is at a higher elevation than said upper surface of said inner base portion of said inner liner; at least a portion of said upper surface of said inner rim portion and said inner base portion of said inner liner can engage a food product that is placed on said container; said corrugated layer having a weight of at least about 1 pound per thousand square feet; said corrugated layer is at least partially connected to at least one of said upper surfaces of said outer liner and said lower surface of said inner liner by an adhesive; a height of a majority of said flutes of said corrugated layer that form said corrugated rim portion of said corrugated layer is less than a height of a majority of said flutes of said corrugated layer in said corrugated base portion of said corrugated layer, a height of at least one said flutes located in said corrugated transition region of said corrugated layer has a height that is less than a height of a majority of said flutes in said corrugated base portion of said corrugated layer, a height of said flutes in said corrugated rim portion of said corrugated layer varying in at least one region of said container rim along a longitudinal length of said container rim, said inner liner including a polymeric coating, said polymeric coating is present on said upper surface of said inner liner, said polymeric coating is formulated to engage a food product that is placed on said container and to inhibit the food product from sticking to said container while the food is heated on said container.

2. The container as defined in claim 1, wherein a height of said flutes in said corrugated rim portion of said corrugated layer located adjacent to said corrugated transition region of said corrugated layer is greater than a height of said flutes in said corrugated rim portion of said corrugated layer that are located at an opposite end of said corrugated rim portion of said corrugated layer.

3. The container as defined in claim 1, wherein said inner liner has a weight that is greater than a weight of said corrugated layer.

4. The container as defined in claim 1, wherein said polymeric coating has a coating weight of at least about 0.05 pounds per thousand square feet, said container configured to heat or cook foods in temperatures of about 200° F.-600° F. and to resist burning.

5. The container as defined in claim 1, wherein said inner liner including a plurality of openings that fully pass through said inner liner, a majority of said openings do not fully pass through said outer liner, said openings are designed to allow a liquid to pass through said openings in said inner liner and result in the liquid being at least partially entrapped between said inner liner and said outer liner.

6. The container as defined in claim 1, wherein said upper surface of said inner liner is embossed to allow air to circulate underneath food positioned on said upper surface of said inner liner during heating of the food.

7. The container as defined in claim 1, wherein said inner rim portion of said inner liner extending upwardly from said inner base portion of said inner liner at an angle of at least about 25°.

8. The container as defined in claim 1, wherein said inner liner has a weight of about 50 to about 100 pounds per thousand square feet, said outer liner has a weight of about 10 to about 70 pounds per thousand square feet, said corrugated layer has a weight of about 10 to about 70 pounds per thousand square feet.

9. The container as defined in claim 1, wherein said inner liner, said outer liner and said corrugated layer are formed of a material selected from the group consisting of paper and paper board.

10. A container designed for use with food products, said container having a base and a container rim that at least partially encircles said base, said container comprising an inner liner, an outer liner and a corrugated layer positioned between said inner and outer liners; said corrugated layer is formed of a plurality of flutes, said corrugated layer having a corrugated base portion, a corrugated rim portion and a corrugated transition region; said outer liner having an upper and a lower surface, said lower surface of said outer liner forming a bottom surface of said container, said outer liner having an outer base portion, an outer rim portion and an outer transition region; said inner liner having an upper and a lower surface, said inner liner is formed of an inner base portion, an inner transition region and an inner rim portion; said inner transition region of said inner liner is positioned between said inner base portion and said inner rim portion; said outer transition region of said outer liner is positioned between said outer base portion and said outer rim portion; said corrugated transition region of said corrugated layer is positioned between said corrugated base portion and said corrugated rim portion; said inner rim portion of said inner liner is at least partially encircling said inner base portion; said outer rim portion of said outer liner is at least partially encircling said outer base portion; said corrugated rim portion of said corrugated layer is at least partially encircling said corrugated base portion; said inner base portion of said inner liner is generally planar; said inner rim portion of said inner liner extending above said inner base portion of said inner liner; an upper surface of said inner rim portion, an upper surface of said inner base portion and an upper surface of said inner transition region of said inner liner forming said upper surface of said inner liner, said upper surface of said inner liner is absent a seam; a majority of said upper surface of said inner rim of said inner liner is at a higher elevation than said upper surface of said inner base portion of said inner liner; at least a portion of said upper surface of said inner rim portion and said inner base portion of said inner liner can engage a food product that is placed on said container; said corrugated layer is at least partially connected to at least one of said upper surfaces of said outer liner and said lower surface of said inner liner by an adhesive; a height of a plurality of said flutes of said corrugated layer that form said corrugated rim portion of said corrugated layer is less than a height of a majority of said flutes of said corrugated layer in said corrugated base portion of said corrugated layer, a height of at least one of said flutes located in said corrugated transition region of said corrugated layer has a height that is less than a height of a majority of said flutes in said corrugated base portion of said corrugated layer, a height of said flutes in said corrugated rim portion of said corrugated layer varying in at least one region of said container rim along a longitudinal length of said container rim, said inner liner including a polymeric coating, said polymeric coating is present on said upper surface of said inner liner, said polymeric coating is formulated to engage a food product that is placed on said container and to inhibit the food product from sticking to said container while the food is heated on said container.

11. The container as defined in claim 10, wherein a height of said flutes in said corrugated rim portion of said corrugated layer located adjacent to said corrugated transition region of said corrugated layer is greater than a height of said flutes in said corrugated rim portion of said corrugated layer that are located at an opposite end of said corrugated rim portion of said corrugated layer.

12. The container as defined in claim 10, wherein said inner liner has a weight that is greater than a weight of said corrugated layer.

13. The container as defined in claim 10, wherein said polymeric coating has a coating weight of at least about 0.05 pounds per thousand square feet, said container configured to heat or cook foods in temperatures of about 200° F.-600° F. and to resist burning.

14. The container as defined in claim 10, wherein said inner liner including a plurality of openings that fully pass through said inner liner, a majority of said openings do not fully pass through said outer liner, said openings are designed to allow a liquid to pass through said openings in said inner liner and result in the liquid being at least partially entrapped between said inner liner and said outer liner.

15. The container as defined in claim 10, wherein said upper surface of said inner liner is embossed to allow air to circulate underneath food positioned on said upper surface of said inner liner during heating of the food.

16. The container as defined in claim 10, wherein said inner rim portion of said inner liner extending upwardly from said inner base portion of said inner liner at an angle of at least about 25°.

17. The container as defined in claim 10, wherein said inner liner has a weight of about 50 to about 100 pounds per thousand square feet, said outer liner has a weight of about 10 to about 70 pounds per thousand square feet, said corrugated layer has a weight of about 10 to about 70 pounds per thousand square feet.

18. The container as defined in claim 10, wherein said inner liner, said outer liner and said corrugated layer are formed of a material selected from the group consisting of paper and paper board.

19. A container having a base and a rim that at least partially encircles said base, said container comprising an inner liner, an outer liner and a corrugated layer that is positioned between said inner and outer liners; said corrugated layer formed of a plurality of flutes, said corrugated layer having a corrugated base portion, a corrugated rim portion and a corrugated transition region; said inner and outer liners are formed of a non-corrugated substrate; said outer liner having an upper and lower surface, said lower surface of said outer liner forming a bottom surface of said container, said outer liner having an outer base portion, an outer rim portion and an outer transition region; said inner liner having a lower surface, said inner liner is formed of an inner base portion, an inner rim portion and an inner transition region; said inner rim portion at least partially encircling said inner base portion, said inner rim portion extending upwardly from a peripheral edge of said inner base portion, said inner transition region positioned between said inner base portion and said inner rim portion; an upper surface of said inner rim portion and an upper surface of said inner base portion and an upper surface of said inner transition region are absent a seam; a majority of said upper surface of said inner rim portion at a higher elevation than said upper surface of said inner base portion; said upper surface of said inner base portion is configured to engage a food product that is placed on said container; said corrugated layer at least partially connected to at least one of said upper surface of said outer liner and said lower surface of said inner liner; a height of a majority of said flutes located in said corrugated rim portion is less than a height of a majority of said flutes in said corrugated base portion, a height of a majority of said flutes located in said corrugated rim portion is less than a height of at least one flute in said corrugated transition region, said at least one flute in said corrugated transition region has a height that is less than a height of a majority of said flutes in said corrugated base portion, said inner liner including a polymeric coating, said polymeric coating is present on said upper surface of said inner liner, said polymeric coating is formulated to engage a food product that is placed on said container and to inhibit the food product from sticking to said container while the food is heated on said container.

20. The container as defined in claim 19, wherein said inner liner has a different weight than at least one of said corrugated layer and said outer liner.

21. The container as defined in claim 19, wherein said polymeric coating has a coating weight of at least about 0.05 pounds per thousand square feet, said container configured to heat or cook foods in temperatures of about 200° F.-600° F. and to resist burning.

22. The container as defined in claim 20, wherein said polymeric coating has a coating weight of at least about 0.05 pounds per thousand square feet, said container configured to heat or cook foods in temperatures of about 200° F.-600° F. and to resist burning.

\* \* \* \* \*